(12) United States Patent
Steele et al.

(10) Patent No.: US 8,194,690 B1
(45) Date of Patent: Jun. 5, 2012

(54) PACKET PROCESSING IN A PARALLEL PROCESSING ENVIRONMENT

(75) Inventors: Kenneth M. Steele, Waltham, MA (US); Vijay Aggarwal, Marlborough, MA (US)

(73) Assignee: Tilera Corporation, Westborough, MA (US)

(*) Notice: Subject to any disclaimer, the term of this patent is extended or adjusted under 35 U.S.C. 154(b) by 278 days.

(21) Appl. No.: 11/753,325

(22) Filed: May 24, 2007

Related U.S. Application Data

(60) Provisional application No. 60/808,163, filed on May 24, 2006.

(51) Int. Cl.
*H04L 12/28* (2006.01)
*H04L 12/56* (2006.01)

(52) U.S. Cl. ........ 370/412; 370/413; 370/414; 370/415; 370/416; 370/428; 370/429; 370/537; 370/541

(58) Field of Classification Search .................. None
See application file for complete search history.

(56) References Cited

U.S. PATENT DOCUMENTS

| | | | |
|---|---|---|---|
| 5,224,100 A * | 6/1993 | Lee et al. ................ 370/408 |
| 5,850,399 A * | 12/1998 | Ganmukhi et al. ........... 370/412 |
| 6,438,134 B1 * | 8/2002 | Chow et al. ................ 370/412 |
| 6,657,955 B1 * | 12/2003 | Bonneau et al. ............. 370/229 |
| 6,754,223 B1 * | 6/2004 | Lussier et al. ............... 370/412 |
| 6,959,002 B2 * | 10/2005 | Wynne et al. ............... 370/412 |
| 7,006,513 B1 * | 2/2006 | Ali et al. ................... 370/414 |
| 7,061,867 B2 * | 6/2006 | Huang et al. ............... 370/235 |
| 7,305,486 B2 * | 12/2007 | Ghose et al. ................ 709/232 |
| 7,321,940 B1 * | 1/2008 | Smith et al. ................ 709/240 |
| 7,394,288 B1 | 7/2008 | Agarwal |
| 7,395,538 B1 * | 7/2008 | Carney et al. .............. 718/105 |
| 7,539,845 B1 * | 5/2009 | Wentzlaff et al. ............ 712/10 |
| 7,554,919 B1 * | 6/2009 | Veeragandham et al. ..... 370/236 |
| 7,826,467 B2 * | 11/2010 | Bennett ..................... 370/412 |
| 7,830,889 B1 * | 11/2010 | Lemaire et al. ............ 370/395.4 |
| 2003/0046429 A1 * | 3/2003 | Sonksen ..................... 709/246 |
| 2004/0059828 A1 | 3/2004 | Hooper et al. |
| 2004/0081091 A1 * | 4/2004 | Widmer et al. .............. 370/230 |
| 2005/0138366 A1 * | 6/2005 | Loh et al. ................... 713/160 |
| 2005/0141503 A1 * | 6/2005 | Welfeld ..................... 370/392 |
| 2006/0070054 A1 * | 3/2006 | Naik et al. ................... 717/165 |

(Continued)

FOREIGN PATENT DOCUMENTS

WO WO 2004/072796 A2 8/2004

OTHER PUBLICATIONS

Agarwal, Anant. "Raw Computation," *Scientific American* vol. 281, No. 2: 44-47, Aug. 1999.

(Continued)

*Primary Examiner* — Ayaz Sheikh
*Assistant Examiner* — Peter Chau
(74) *Attorney, Agent, or Firm* — Fish & Richardson P.C.

(57) ABSTRACT

Packets are processed in a system that comprises a plurality of interconnected processor cores. The system receives packets into one or more queues. The system associates at least some nodes in a hierarchy of nodes with at least one of the queues, and at least some of the nodes with a rate. The system maps a set of one or more nodes to a processor core based on a level in the hierarchy of the nodes in the set and based on at least one rate associated with a node not in the set. The packets are processed in one or more processor cores including the mapped processor core according to the hierarchy.

28 Claims, 24 Drawing Sheets

U.S. PATENT DOCUMENTS

| | | | | |
|---|---|---|---|---|
| 2006/0133369 A1* | 6/2006 | Zhang | ............................ | 370/389 |
| 2006/0140192 A1* | 6/2006 | Jain et al. | .................... | 370/395.4 |
| 2006/0140201 A1* | 6/2006 | Kumar et al. | .................. | 370/412 |
| 2006/0206620 A1* | 9/2006 | Devanagondi et al. | ........ | 709/234 |
| 2006/0233100 A1* | 10/2006 | Luft et al. | ...................... | 370/229 |
| 2007/0130445 A1* | 6/2007 | Lau et al. | .......................... | 712/11 |
| 2007/0223504 A1* | 9/2007 | Jain et al. | ....................... | 370/412 |

OTHER PUBLICATIONS

Taylor, Michael Bedford et. al., "Evaluation of the Raw Microprocessor: An Exposed-Wire-Delay Architecture for ILP and Streams," *Proceedings of International Symposium on Computer Architecture*, Jun. 2004.

Taylor, Michael Bedford et. al., "Scalar Operand Networks: On-Chip Interconnect for ILP in Partitioned Architectures," *Proceedings of the International Symposium on High Performance Computer Architecture*, Feb. 2003.

Taylor, Michael Bedford et. al., "A 16-Issue Multiple-Program-Counter Microprocessor with Point-to-Point Scalar Operand Network," *Proceedings of the IEEE International Solid-State Circuits Conference*, Feb. 2003.

Taylor, Michael Bedford et. al., "The Raw Microprocessor: A Computational Fabric for Software Circuits and General-Purpose Programs," *IEEE Micro*, pp. 25-35, Mar.-Apr. 2002.

Lee, Walter et. al., "Space-Time Scheduling of Instruction-Level Parallelism on a Raw Machine," *Proceedings of the Eighth International Conference on Architectural Support for Programming Languages and Operating Systems (ASPLOS-VIII)*, San Jose, CA, Oct. 4-7, 1998.

Kim, Jason Sungtae et. al., "Energy Characterization of a Tiled Architecture Processor with On-Chip Networks," *International Symposium on Low Power Electronics and Design*, Seoul, Korea, Aug. 25-27, 2003.

Barua, Rajeev et. al., "Compiler Support for Scalable and Efficient Memory Systems," *IEEE Transactions on Computers*, Nov. 2001.

Waingold, Elliot et. al., "Baring it all to Software: Raw Machines," *IEEE Computer*, pp. 86-93, Sep. 1997.

Lee, Walter et. al., "Convergent Scheduling," *Proceedings of the 35$^{th}$ International Symposium on Microarchitecture*, Istanbul, Turkey, Nov. 2002.

Wentzlaff, David and Anant Agarwal, "A Quantitative Comparison of Reconfigurable, Tiled, and Conventional Architectures on Bit-Level Computation," *MIT/LCS Technical Report LCS-TR-944*, Apr. 2004.

Suh, Jinwoo et. al., "A Performance Analysis of PIM, Stream Processing, and Tiled Processing on Memory-Intensive Signal Processing Kernels," *Proceedings of the International Symposium on Computer Architecture*, Jun. 2003.

Barua, Rajeev et. al., "Maps: A Compiler-Managed Memory System for Raw Machines," *Proceedings of the Twenty-Sixth International Symposium on Computer Architecture (ISCA-26)*, Atlanta, GA, Jun. 1999.

Barua; Rajeev et. al., "Memory Bank Disambiguation using Modulo Unrolling for Raw Machines," *Proceedings of the Fifth International Conference on High Performance Computing*, Chennai, India, Dec. 17-20, 1998.

Agarwal, A. et. al., "The Raw Compiler Project," *Proceedings of the Second SUIF Compiler Workshop*, Stanford, CA, Aug. 21-23, 1997.

Taylor, Michael Bedford et. al., "Scalar Operand Networks," *IEEE Transactions on Parallel and Distributed Systems (Special Issue on On-Chip Networks)*, Feb. 2005.

Taylor, Michael. The Raw Prototype Design Document V5.01 [online]. Department of Electrical Engineering and Computer Science, Massachusetts Institute of Technology, Sep. 6, 2004 [retrieved on Sep. 25, 2006]. Retrieved from the Internet: <ftp://ftp.cag.1cs.mit.edu/pub/raw/documents/RawSpec99.pdf>.

Moritz, Csaba Andras et. al., "Hot Pages: Software Caching for Raw Microprocessors," *MIT/LCS Technical Memo LCS-TM-599*, Aug. 1999.

* cited by examiner

PACKET PROCESSING IN A PARALLEL PROCESSING ENVIRONMENT

CROSS-REFERENCE TO RELATED APPLICATIONS

This application claims priority to U.S. Provisional Application Ser. No. 60/808,163, filed on May 24, 2006, incorporated herein by reference.

BACKGROUND

The invention relates to packet processing in a parallel processing environment.

Packets of information that are to be received, processed, and transmitted by an integrated circuit are often scheduled using a scheduling algorithm. Some scheduling algorithms use a priority associated with each packet of information when scheduling the packet. An information packet or portion of the packet may be added to a priority queue upon packet receipt by the integrated circuit, and the received information packet may have an associated priority. The information packet or portion of the packet having the highest priority may be removed from the priority queue for transmission from the integrated circuit. One way of maintaining a priority queue for scheduling information packets involves using an associative array that maps each priority to a list of packets having that priority.

SUMMARY

In one aspect, in general, the invention features a method for processing packets in a system that comprises a plurality of interconnected processing cores, the method comprising: receiving packets into one or more queues; associating at least some nodes in a hierarchy of nodes with at least one of the queues, and at least some of the nodes with a rate; mapping a set of one or more nodes to a processor core based on a level in the hierarchy of the nodes in the set and at least one rate associated with a node not in the set; and processing the packets in the mapped processor cores according to the hierarchy.

Aspects of the invention can include one or more of the following features.

Mapping a set of one or more nodes to a processor core comprises mapping a plurality of nodes at the same level in the hierarchy to a first processor core that is responsible for a first function for the plurality of nodes.

The method further comprises mapping the plurality of nodes to a second processor core that is responsible for a second function for the plurality of nodes.

The first function comprises a scheduling function in which packets are processed according to a credit-based permission system.

The first function comprises a rate-limiting function in which an average rate at which packets are processed is limited.

Each node in the set is associated with a rate-limit, and mapping the plurality of nodes to the first processor core comprises selecting a plurality of nodes according to a sum of the rate-limits of the plurality of nodes that provides a maximum rate at which at least portions of packets can be transmitted from the first processor core.

The rate associated with a node not in the set comprises a rate associated with a node mapped to a second processor core that receives packets from the first processor core.

The sum of the rate-limits is no greater than the rate associated with the node mapped to the second processor core.

The mapping occurs before the packets have been received into the one or more queues.

At least some of the mapping occurs after at least some of the packets have been processed in processor cores that have already been mapped.

Processing the packets comprises passing at least a portion of at least some of the packets received in the queues from a processor core mapped to a node associated with at least one of the queues through processor cores mapped to a series of nodes at different levels of the hierarchy.

A portion of a packet is passed from a processor core mapped to a first node at a first level to a processor core mapped to a second node at a second level only when one or more credit-related conditions are met.

A first credit-related condition comprises the first node receiving flow credits from the second node according to an ability of the second node to receive additional packet portions from the first node.

A second credit-related condition comprises the first node receiving rate credits based on a rate limit that indicates a maximum transfer rate for the first node.

Passing at least a portion of a packet comprises passing a packet descriptor that includes a number of bytes of data in the corresponding packet and a pointer to the packet.

Passing at least a portion of a packet from the processor core mapped to the first node to the processor core mapped to the second node comprises passing a portion of the packet over a network connection between the processor cores.

In another aspect, in general, the invention features a system. The system includes a plurality of processor cores interconnected by an interconnection network; and information for configuring the system to execute instructions to receive packets into one or more queues; associate at least some nodes in a hierarchy of nodes with at least one of the queues, and at least some of the nodes with a rate; map a set of one or more nodes to a processor core based on a level in the hierarchy of the nodes in the set and at least one rate associated with a node not in the set; and process the packets in the mapped processor cores according to the hierarchy.

Aspects of the invention can include one or more of the following features.

The system further comprises a memory for storing the information for configuring the system.

The interconnection network comprises a two-dimensional network.

The interconnection network comprises a bus network, a ring network, a mesh network, or a crossbar switch network.

Each of the plurality of processor cores corresponds to a tile on an integrated circuit, each tile comprising: a computation unit; and a switch including switching circuitry to forward data received over data paths of the interconnection network from other tiles to the computation unit and to switches of other tiles, and to forward data received from the computation unit to switches of other tiles.

The computation unit comprises a pipelined processor and the switch is coupled to a plurality of pipeline stages of the pipelined processor.

At least one port of the switch is mapped to a register name space of the pipelined processor.

Aspects of the invention can have one or more of the following advantages.

The hierarchical queuing techniques can be implemented on a multicore integrated circuit to provide flexible and powerful processing capability.

Each logical node in the hierarchical tree structure of nodes can be implemented using a pair of functions called rate-limiting and scheduling functions. These two functions can be implemented using a pair of cores (e.g., neighboring cores) each function being assigned to a core.

Furthermore, the communication between the two functions can be pipelined, and scheduled over the on-chip networks in a multicore processor, without necessarily going through memory (external or on-chip).

At each level of the hierarchy, a certain number of nodes can be assigned for processing to a pair of cores, where the number of nodes assigned is determined by two factors: (1) The number of nodes, and (2) the traffic through those nodes. In other words, node assignment can be based on the sum of the rates at which packets are expected in each of the nodes.

Flow control can be provided using a credit based scheme, for example.

A push model can be used for packet descriptors: Packet descriptors are queued in the input queues; they are then copied from a child node to a parent node (forward) when it is time to move the packet forward.

Packet descriptors can be sent directly from one node to another over the on-chip interconnect without going through memory. Alternatively, a pointer to the packet descriptors are sent over the interconnect between nodes, while the packet descriptor itself is placed in shared memory.

Assigning nodes to processor cores based on the sum of the rates at which packets are expected in each of the nodes assures load-balanced processing in each of the cores.

If a core has only one node mapped to it, then the rate limiter has less to do, so each of the core software implementations can be specialized to increase the overall processing performance. For example, the rate limiter does only the timing of when it can transmit.

Combining rate limiting of the child nodes, with the flow control between the child nodes and the parent, which allows you to over-allocate the rate limit of the child.

By using a push mode for packet descriptors, packet descriptors are available at the stream node when they are needed, yielding lower latency. This scheme can in some cases be better than a pull scheme. In a pull scheme, a given node gets a packet from a child node to send when it determines it needs to send a packet.

Other features and advantages of the invention will become apparent from the following description, and from the claims.

DESCRIPTION

1 Packet Scheduling

Figure 1:
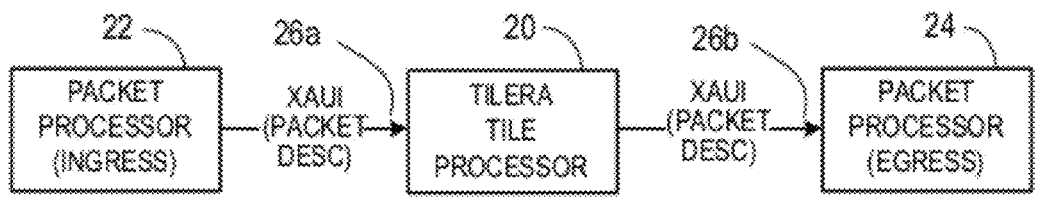
FIG. 1 is a block diagram of packet processors.

Techniques for scheduling packets include techniques for queueing flows of packets on a multicore processor architecture. A packet scheduling function (for example, a "Fine-Grained Queuing" function) is used in a system that receives packets on some number of inputs (e.g., IP packets), buffers the packets, and retransmits them on some number of outputs. The fine-Grained Queuing function determines the order in which packets are transmitted on each output. A logical hierarchy of nodes represents logical structures associated with scheduling received packets for transmission. For example the levels can include nodes representing queues, sub-ports, ports, and streams. The nodes can be mapped onto processor cores by grouping nodes from the same level of the hierarchy. Load balancing among the processor cores can be based on rate-limits associated with the nodes.

In some implementations, packets of information may be received and may include a packet body and a packet descriptor. The packet body may be stored to a memory location, which may be on-chip or off-chip depending upon the implementation. In some cases the packet body may be processed, while in others it may be stored to memory while the scheduling operations occur and retrieved from memory and reunited with the packet descriptor for transmission. In the description of various implementations herein, processing a "packet" may refer to processing an entire packet including the packet body or a portion of a packet such as the packet descriptor. The packet descriptor will be discussed in more detail below, but generally it may contain information that the scheduling algorithm may use to schedule the packet for transmission. In general, the scheduling algorithm may operate to manage the flow of packets through the chip such that bandwidth is efficiently utilized, packets having higher priority receive heightened attention, and resources are balanced and appropriately allocated to increase performance.

The hierarchical structure of nodes may be used as part of the packet scheduling process. The hierarchy may consist of nodes at various levels within the hierarchy, and packets may be passed between levels of the hierarchy in a coordinated fashion. The nodes can be mapped to processor cores of the chip, according to an implementation. Each level in the hierarchy may include one or more core groups, according to an implementation. A number of core groups needed may be based on a number of packets per second that can be processed by each core group, according to an implementation. A core group may include one or more cores, each of which may be responsible for a function at that level of the hierarchy. For example, a core group may consist or a scheduler core and a rate-limiter core in some implementations, and the core group may process packets at a rate equal to the slower of the rate of the scheduler core or the rate-limiter core, according to an implementation.

Scheduler cores may implement scheduling algorithms that include a credit-based permission system, whereby packets or portions of packets may be forwarded to the parent node, which is the node to which the node forwards packets or portions of packets, in the next hierarchy level only when one or more credit-related conditions are met. In some implementations, multiple credit types may be used. For example, a scheduling algorithm that utilizes "rate" credits and "flow" credits may be used in some implementations. Each node may maintain a running balance of the one or more credit types, such as rate credits and flow credits, and may take actions according to a present balance for each credit type. Initially, the flow credit balance for a node may be set to a number of packet descriptor buffers that are allocated to that node in the node's parent node. The parent node may thereafter provide additional flow credits to the node according to its ability to receive additional packet descriptors from the node, according to some implementations. In this fashion, a coordinated permission system may be established throughout the hierarchy, which may permit efficient transfer of packets therethrough. A node may decrement its flow credit balance when it sends a packet descriptor, for example.

A node may accumulate rate credits based on a rate limit, which may indicate a maximum packet transfer rate for the node, sent to the node by a rate limiter associated with the node and a clock rate associated with the node. The rate limit may be determined by the rate-limiter core, for example. Thus, the scheduler core and the rate-limiter core may work in concert to manage flows of data through the chip. In some implementations, the maximum transfer rate may be determined using a weighted round-robin technique to assign the node a rate corresponding to its weighted share of the parent node bandwidth. The rate limit may be a ratio of the clock rate, for example. The rate limit may be determined based on a load balancing among the cores that are handling nodes within the respective hierarchy level. As such, the node may accumulate rate credits over time as a ratio of the clock rate associated with the node.

FIG. 1 is a block diagram of packet processors, and shows an exemplary systems context view. A packet scheduling function, referred to here as "fine-grained queuing," may be performed in the tiled processor 20 and may be used in a system that receives packets (e.g., IP packets) on some number of logical inputs, buffers the packets and retransmits them on some number of logical outputs. Fine-grained queuing may determine the order in which packets are transmitted on each output. In an implementation, the logical inputs are called "flows" and the logical outputs are called "streams." The number of flows need not be equal to the number of streams.

In the example shown in FIG. 1, the tiled processor 20 that performs the fine-grained queuing function is connected to an ingress packet processor block 22 and to an egress packet processor block 24. Connections 26 from the ingress packet processor 22 to the tiled processor 20 and tiled processor 20 to the egress packet processor 24 may be over high-speed serial links (such as, for example, XAUI or PCI-e). The connections 26 can also be over a parallel bus. The three blocks 20, 22, 24 can also be connected to a common shared memory so that packet data can be written into shared memory and another block can read it without needing a copy.

The ingress packet processor 22 represents the system that receives the packets from the external world and buffers the packet data. The ingress processor 22 can buffer user traffic.

It may also map the packet to one of a number of flows. In one example, there are 64 k flows, but there could be more or fewer.

In an implementation, a packet descriptor may be created that contains a number of bytes of data in the packet, a pointer to the packet and the flow to which the packet belongs. The flow may be represented by a flow number, which may also represent the number of the input queue in the scheduling hierarchy, to be described in more detail below. The ingress packet processor block 22 may pass the packet descriptor to the fine-grained queuing block, which may be implemented in the tiled processor 20 in an implementation. The tiled processor 20 may perform scheduling operations for each of the output streams. Each input flow may map to one output stream, according to an implementation. For each stream, the fine-grain queuing function may determine which packet is to be sent next. The tiled processor 20 may send the packet descriptors of the packets to be transmitted to the egress Packet Processor 24, which may read the packet's data from memory and transmit the packet on an output. The egress packet processor 24 can forward packets in a sequence based on the tiled processor packet descriptor. In some implementations, each of the ingress processor 22, tiled processor, and egress processor 24 may reside within a single device, while in other implementations functionality may be combined or separated, and they may reside in two or more different devices.

Figure 2:
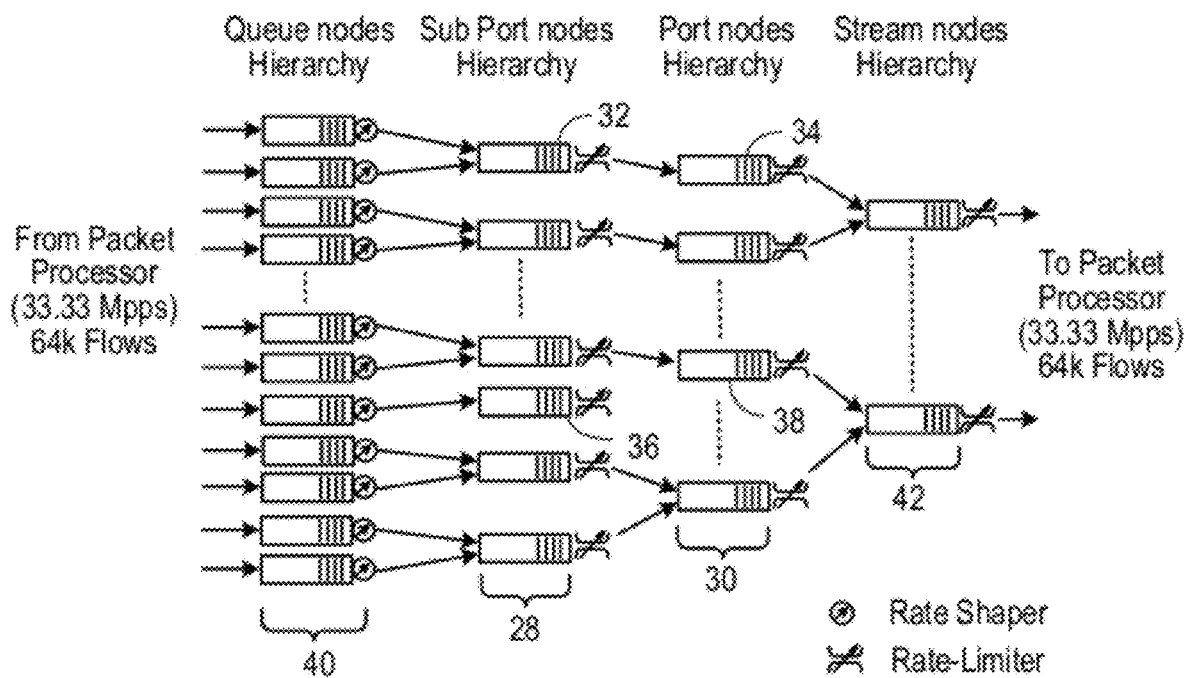
FIG. 2 is a block diagram of a hierarchical node structure.

FIG. 2 is a block diagram of a hierarchical node structure. The structure may be used for a scheduling function. In an implementation, the fine-grained queuing and scheduling algorithm that may be mapped into the tiled processor 20 (FIG. 1) may have a hierarchical node structure as shown in FIG. 2. A node to the right in the FIG. 2 hierarchy may be considered a parent node of a node to the left. For example, nodes in the second column of nodes 28 may be children of nodes in the third column of nodes 30, such as node 32 being a child of node 34 (and correspondingly, node 34 being a parent of node 32) and node 36 being a child of node 38. Node functions can include rate limiting or shaping, and a weighted round robin (WRR) scheme may be used on queues. Flow-to-node mapping may be established at call setup, for example, as described in more detail below. Hierarchical-independent processing on all nodes may be used.

The hierarchical queuing chip may support multiple levels of hierarchy. First level nodes 40 may be queues. Top-level nodes 42 may be streams. In this example, where four levels 40, 28, 30, 42 of hierarchical nodes are shown, the in-between levels 28, 30 contain "sub-port" and "port" nodes, respectively. A queue 40 can feed a sub-port 28, port 30 or stream node 42, depending on the implementation. Similarly, a sub-port 28 can feed a port 30 or stream 42. Also, a port 30 can feed a stream 42, as shown in FIG. 2. More or fewer levels of hierarchy are possible. Multiple hierarchy levels may handle over-allocation of bandwidth. In the example shown in FIG. 2, each of the sub-port 28, port 30 and stream 42 nodes has a rate limiter on its output. The rate limiter enforces a maximum rate (e.g., in bits per second) averaged over a time window for a set of packets. The rate limiter does not enforce the relative placement of the packets within that time window.

Each node can optionally have a rate shaper on its output. As shown in FIG. 2, each of the queue nodes 40 has a rate shaper on its output. A rate shaper distributes the set of packets within a time window, for example in an even distribution, while also enforcing a maximum rate. An example of a rate shaper is the "leaky bucket" algorithm for smoothing traffic flow that aims to remove burstiness from the packet flow.

Weighted round-robin sharing of the bandwidth can be implemented by assigning each child node a rate that is its weighted share of the parent's bandwidth, according to an implementation. In some implementations, one or more of the children can be allowed to send more than its allocated share (which may over-allocate the parent's bandwidth) by setting the child's rate limit higher than its weighted round robin share of the parent's bandwidth. In this case, that child's priority may be referred to as "strictly-high priority." If the strictly-high priority child sends more than its allocated share of the parent's bandwidth, the parent may still be rate-limited, and may start to apply pressure back on its child nodes by not returning flow credits as fast as the child node may want to send data.

In an implementation, input to the queuing chip is a stream of input packet descriptors (IPDs), which may consist of the input queue number for the packet, the number of bytes in the packet, and a pointer to the packet, which may be stored in the input packet processing chip. The input packet descriptors can arrive on a high speed serial port (such as, for example, XAUI or PCI-e). In an implementation, a maximum IPD arrival rate is 33.33 million packets per second, which corresponds to 20 Gbps with a minimum packet size of 75 bytes.

The Queuing chip may determine when to send each IPD on an output stream. In one example, a maximum total output rate of packet descriptors is 33.33 million packets per second, and a maximum packet rate on any one node is 16.67 million packets per second. The output packet descriptors can be sent off the queuing chip on a high speed serial port (such as, for example, XAUI or PCI-e).

Figure 3:
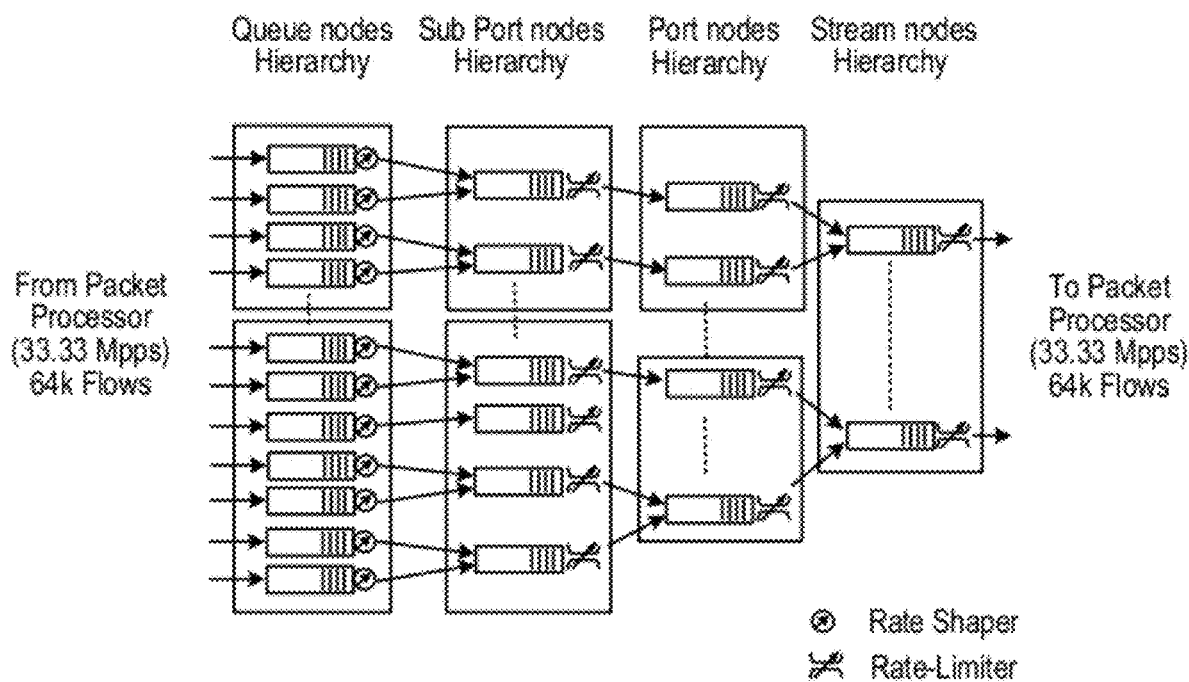
FIG. 3 is a block diagram of nodes mapped to cores.

FIG. 3 is a block diagram of nodes mapped to cores. In an implementation, the logical hierarchy of nodes may be mapped onto processor cores by grouping nodes from the same level of the hierarchy based on balancing the total rate (e.g., from the rate limiting). Nodes in the hierarchy can each have a rate-limit, which may refer to the maximum rate at which they can transmit packets. Load balancing among the cores that are handling the nodes from one level of the hierarchy can be achieved by balancing the sum of the rates for the nodes on each core.

Figure 4:
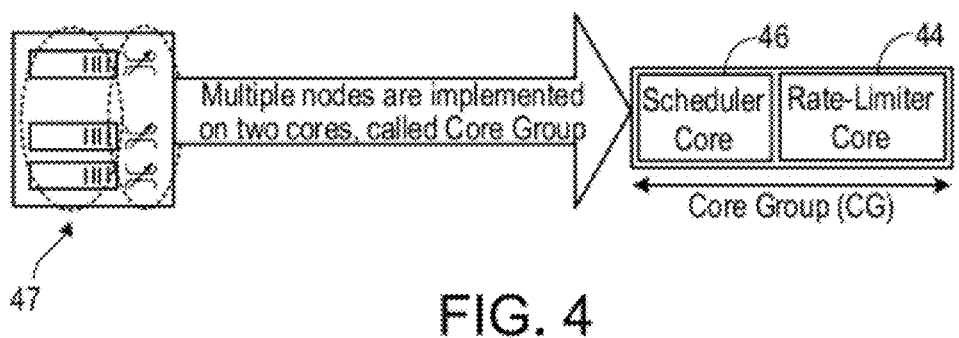
FIG. 4 is a block diagram of a mapping of nodes to a core group.

FIG. 4 is a block diagram of a mapping of nodes to a core group. For each node, rate limiting and scheduling may be implemented. FIG. 4 shows a rate-limiter core 44 and a scheduler core 46, which may respectively implement the rate-limiting and scheduling functions. As FIG. 4 shows, multiple nodes 47 may be implemented on the two cores 44, 46, which together may be referred to as a "core group," in this example.

In an implementation, the scheduling function may include receiving packet descriptors (IPDs) from child nodes, and adding the IPDs to queues for the node based on a priority (e.g., low or high priority for examples with two priorities). Each node may have one queue for each of the two priority levels in this example. In other examples, additional priority levels and/or additional queues may be used. Scheduling may further include checking to determine if there are enough rate credits to send a packet. If not, a message may be sent to the rate-limiting tile with the time when the next packet can be sent. If current balances for both rate-credits and flow-credits are positive, a packet may be sent to the parent node. The parent node may then send a flow credit to the child node from which it received the packet. In this way, the child node may receive flow credits from parent nodes and may increment a flow-credit counter, thereby increasing the flow credit balance. In some implementations, flow credits may be per logical node. When the rate limiter indicates that the node is ready to send a packet, the node may be roused from a secondary mode, such as a sleep mode. In some implementations, the scheduler core 46 performs WRR and priority scheduling for packet descriptors from child nodes.

As shown in FIG. 4, scheduling and rate limiting may be implemented on separate cores. The rate-limiter core 44 manages a priority queue to find the node that will transmit next, according to an implementation, and may rate limit each node mapped to the core group. The rate-limiter core 44 may communicate with the scheduler core 46 using a static network. In some implementations, a dynamic network could also be used.

In an implementation, one rate credit is subtracted for each byte of the packet that is being sent. A packet may only be sent when the node's rate-credits are positive, in some implementations. Rate credits, which can be fractional, may be added every clock cycle based on the rate-limit sent to the node. The rate credits can be stored as a fixed-point number.

In an implementation, each child node may be given a number of flow credits equal to the number of packet descriptor buffers it has been allocated in its parent node. The child subtracts one flow credit when it sends a packet descriptor and adds a flow credit when a flow credit is returned by its parent node.

Figure 5:
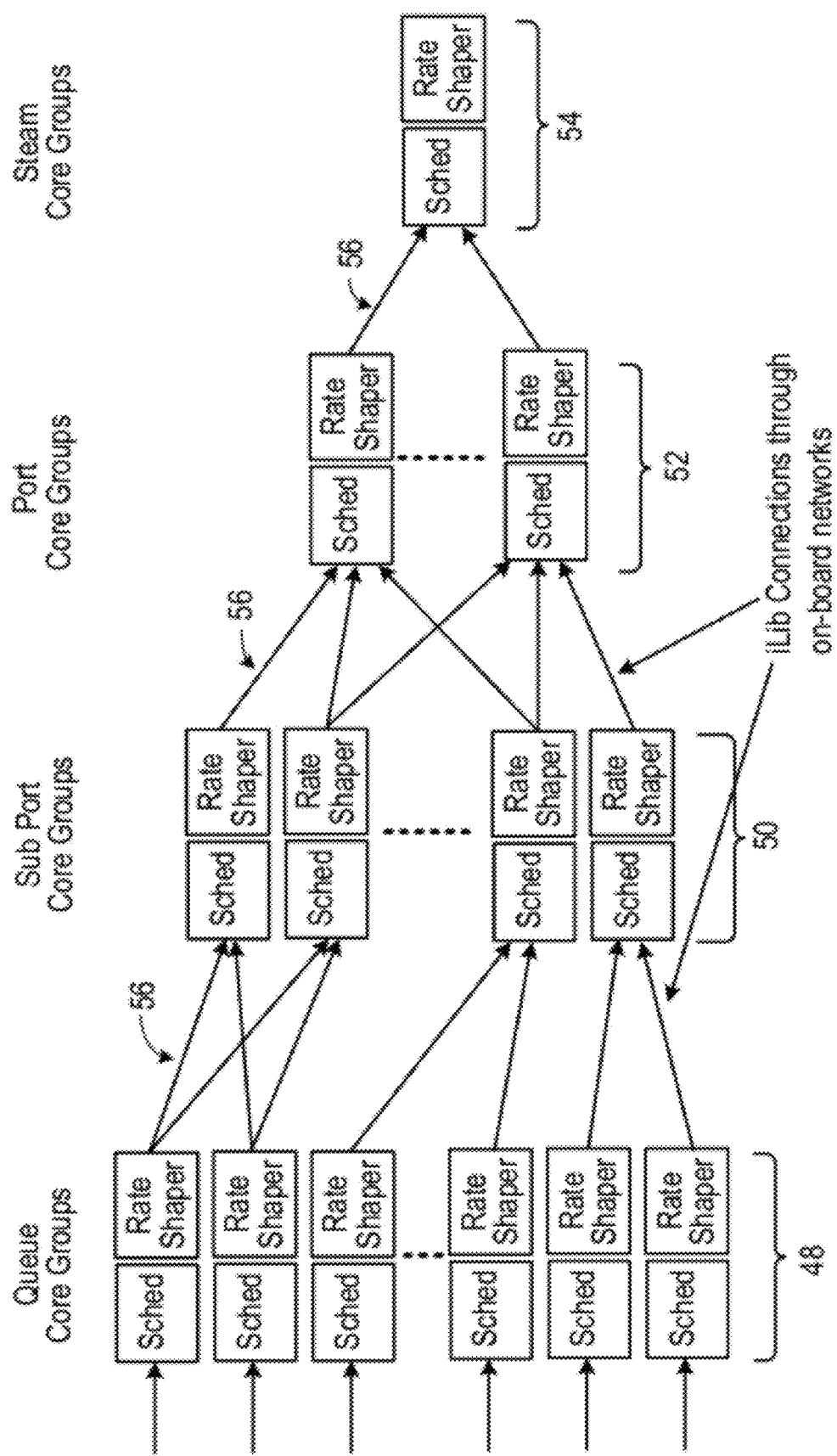
FIG. 5 is a block diagram of a hierarchical core group structure.

FIG. 5 is a block diagram of a hierarchical core group structure. In an implementation, the cores (e.g., one scheduler core and one rate-limiter core) form a "core group" that can be placed on adjacent cores in the tiled processor 20. For example, FIG. 5 shows, for each of queue 48, sub-port 50, port 52, and stream 54 core groups, how a scheduling core and a rate shaper or rate limiter core may be mapped to adjacent cores in the hierarchy. Alternatively, the cores in the core group don't necessarily need to be adjacent. For example, the static network can route traffic across other cores between the two cores of the core group. Each core group may have many connections to both parent core groups and child core groups, according to an implementation. Each core group may assign multiple nodes from within the same hierarchy level. Communication between the core groups can occur over an on-chip user dynamic network (not shown in FIG. 5). This may allow the core groups to be placed in any arrangement on the chip. Communication between cores in different levels of the hierarchy can occur over on-chip networks 56. The packet descriptors can be transmitted over the dynamic networks and stored in the nodes. In some implementations, the queue level 48 has additional buffering for a larger number of packet descriptors. In an implementation, up to three million packet descriptors can be buffered.

Figure 6:
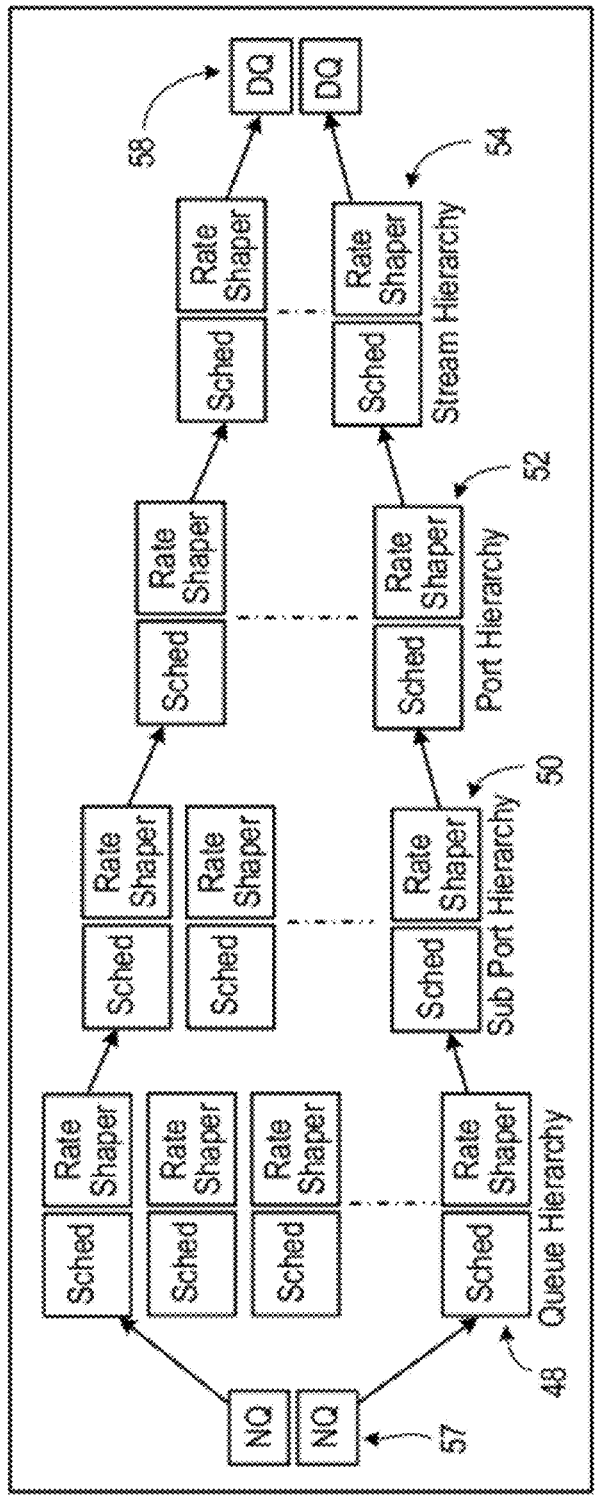
FIGS. 6-8 are block diagrams of exemplary configurations mapping nodes to core groups.
Figure 6:
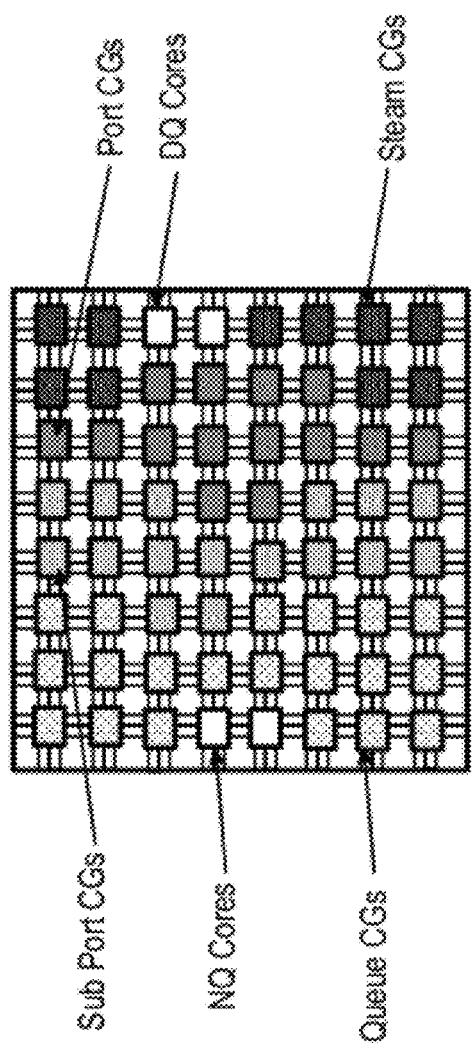

FIG. 6 is a block diagram of an exemplary configuration mapping 128 output Streams. A number of core groups needed for each level of the hierarchy when there are 128 output Streams will now be discussed. In this example, the number of core groups needed is based on the number of packets per second that can be handled by each core group. The speed of the rate-limiter depends on the number of nodes stored in the priority queue. For example, the more nodes, the slower the priority queue.

The example of FIG. 6 shows ten core groups with 44 k nodes in the queue hierarchy level 48, eight core groups with 16 k nodes in the sub-port hierarchy level 50, seven core groups with 4 k nodes in the port hierarchy level 52, and five core groups with 128 nodes in the stream hierarchy level 54, for a total of thirty core groups (corresponding to 60 cores, since in this example each core group has two cores). The "NQ" cores 57 can be used to process the input data from the high-speed serial input and map the input flow number to the core group on which that flow's input queue node is assigned. The "DQ" cores 58 can accept the packet descriptors from the output streams and send them out over the high-speed serial link (XAUI or PCI-e) to the packet processor.

Figure 7:
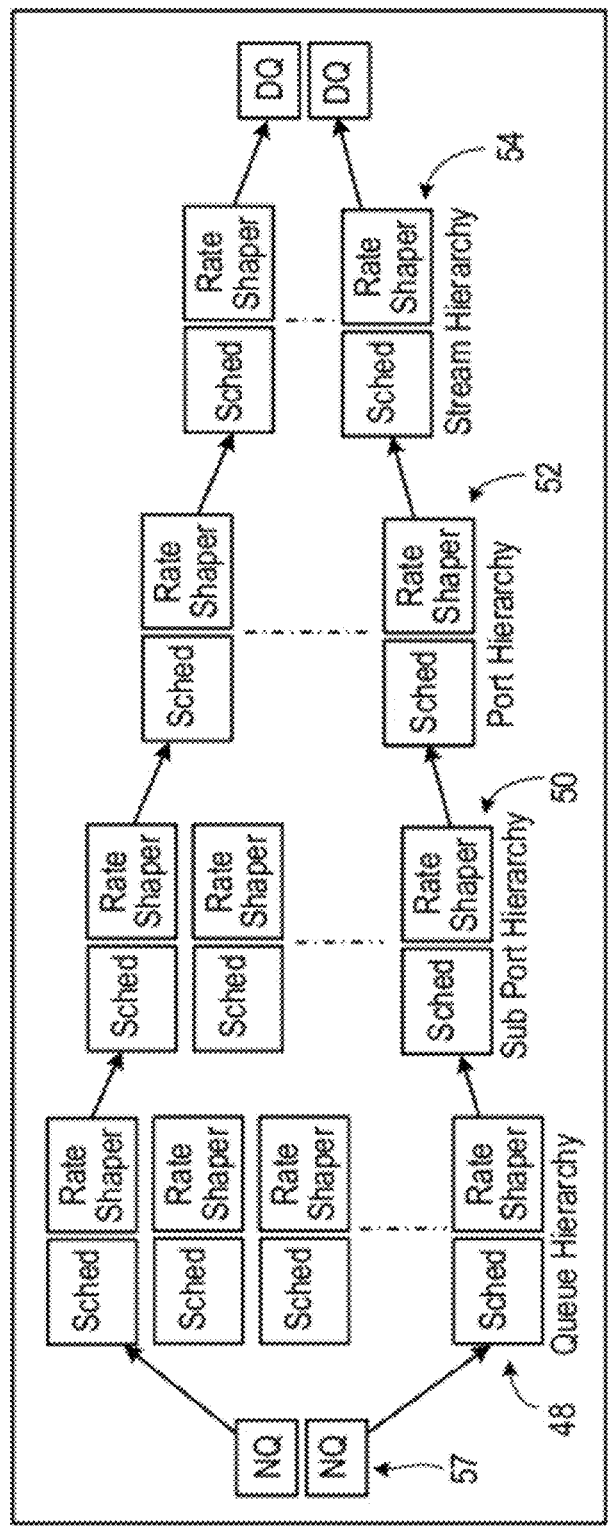
Figure 7:
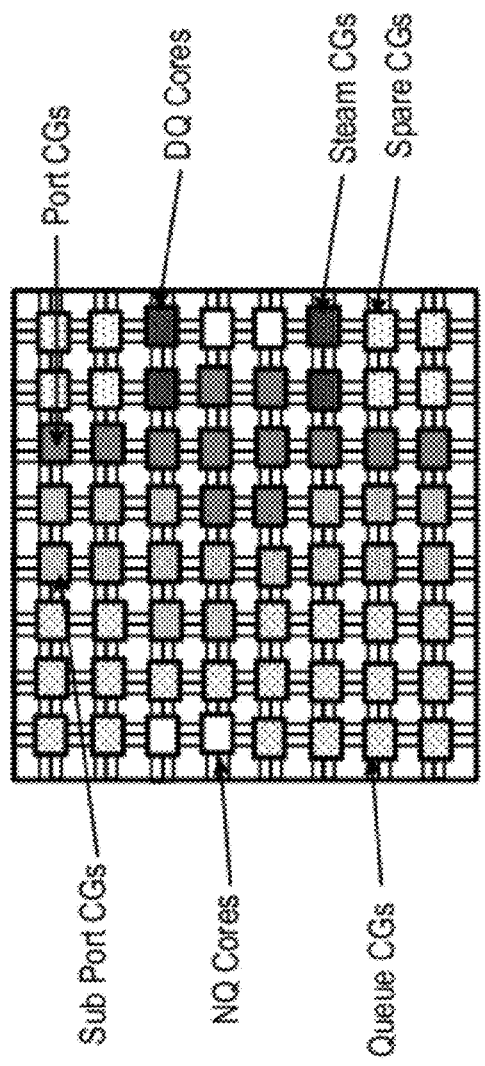

FIG. 7 is a block diagram of an exemplary configuration for the node hierarchy with two output streams, each running at 16.67 million packets per second. In this example, the streams are specially coded to move some of the work from the scheduler core to the rate-limiter core, since otherwise the rate-limiter would only be maintaining a priority queue of size one. The rate-limiter, in this example, only sends a packet to the scheduler when the rate-credits are positive. The scheduler core can then check the input hardware FIFO from the rate-limiter core to see if it can send a packet.

The example of FIG. 7 shows eleven core groups with 55 k nodes in the queue hierarchy level 48, seven core groups with 8 k nodes in the sub-port hierarchy level 50, six core groups with 1 k nodes in the port hierarchy level 52, and two core groups with two nodes in the stream hierarchy level 54, for a total of twenty-six core groups (corresponding to 52 cores, since in this example each core group has two cores).

Figure 8:
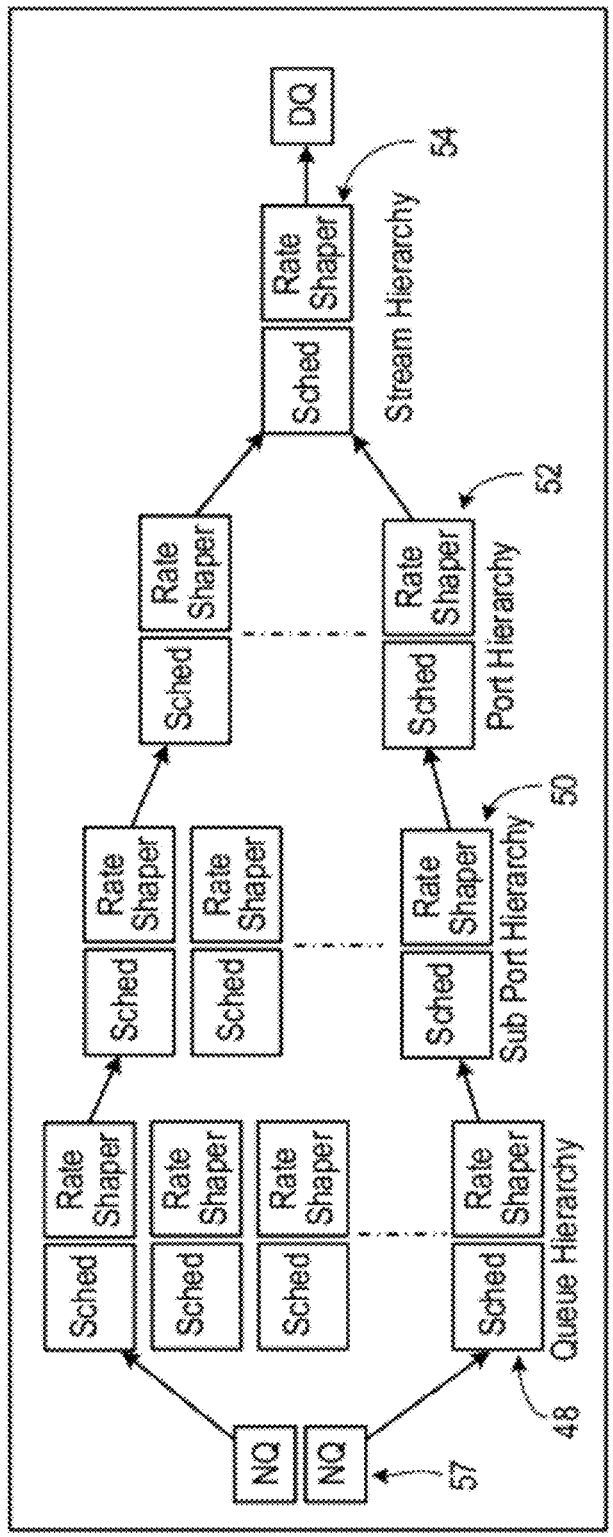
Figure 8:
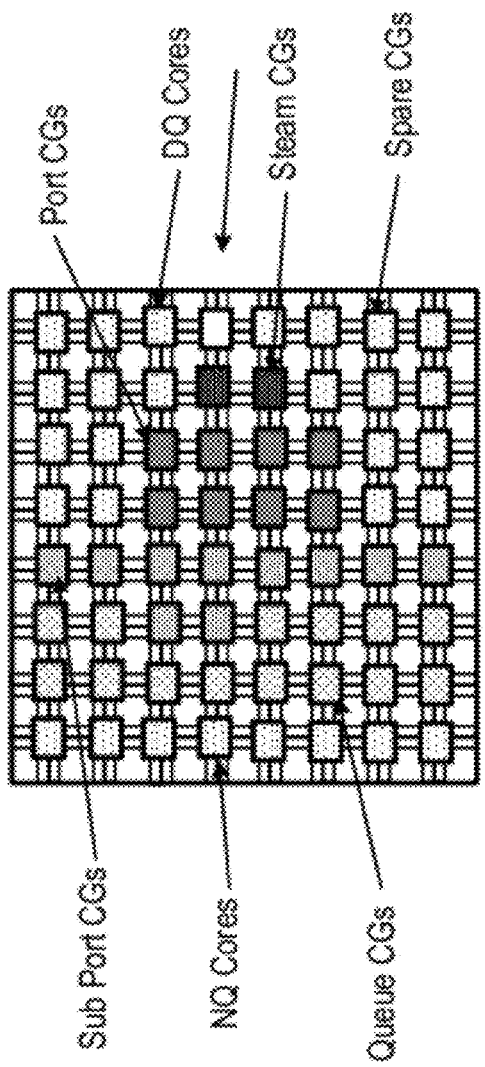

FIG. 8 is a block diagram of an exemplary configuration where the total packet rate is 16.67 Mpps instead of 33.33 Mpps, as was the case in the two previous examples. In this example, there is a single output stream. The example of FIG. 8 shows eight core groups with 55 k nodes in the queue hierarchy level 48, four core groups with 4 k nodes in the sub-port hierarchy level 50, four core groups with 4 k nodes in the port hierarchy level 52, and one core group with one node in the stream hierarchy level 54, for a total of seventeen core groups (corresponding to 34 cores, since in this example each core group has two cores).

Figure 9:
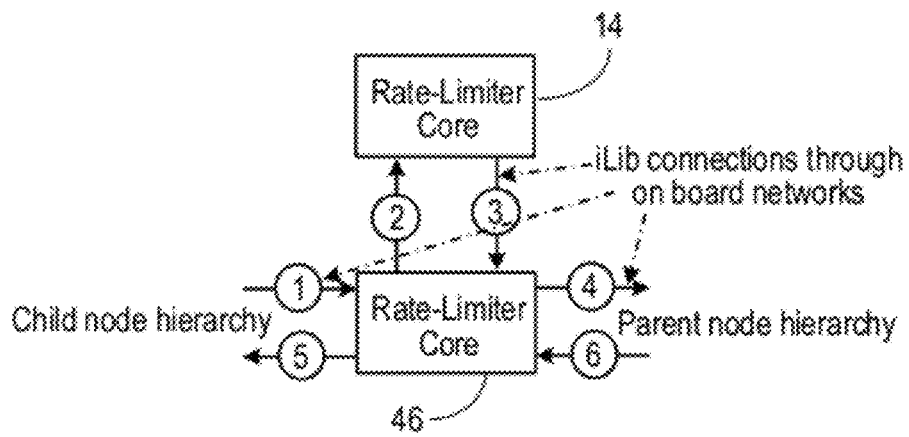
FIG. 9 is a block diagram showing details of scheduler processing.

FIG. 9 is a block diagram showing details of scheduler processing, including actions that the scheduler core may perform to process a packet. For example, the scheduler core 46 may receive a packet descriptor from a child node (labeled "1" in FIG. 9) and send the node to the rate limiter core 44 ("2"). The node may subsequently be returned to the scheduler core 46 from the rate-limiter core 44 ("3"). A packet descriptor at the head of a highest priority FIFO may be sent to the parent node ("4"), and a flow credit may be sent to the corresponding child node from which the scheduler core received the packet ("5"). Subsequently, the parent node may send a flow credit to the scheduler core after the parent core has received and processed the packet ("6").

In an implementation, the time it takes to process one packet may determine the rate at which packets can be processed by the scheduler core. In an implementation, this may correspond to the time to process the six actions described above for one node, and may be represented in Mpps (Millions of Packets per Second) per core group. For example, a rate of 6 Mpps may be appropriate for stream core groups and a rate of 5 Mpps may be appropriate for queue, sub-port and port core groups, in one example. These rates may be independent of the number of nodes processed by the scheduler core. In an implementation, the core group can process packets at the rate of the scheduler core or the rate-limiter core, which ever is lower.

Figure 10:
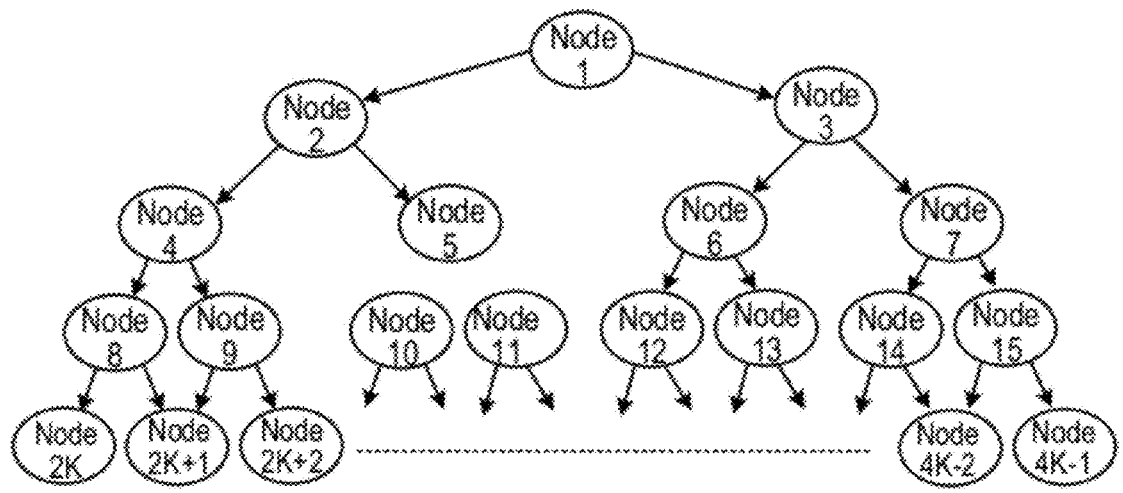
FIG. 10 is a tree structure showing details of rate-limiter processing.

FIG. 10 is a tree structure showing details of rate-limiter processing. In an implementation, the rate-limiter core manages a priority queue where the "key" is a time, measured in clock cycles, and the "value" is the index of a node on the scheduler core. The priority queue may be sorted to keep the earliest time at the top of the queue. The priority queue can be implemented as a heap, which may be an array of (Key, Value) pairs. No pointers need be used, as moving between child and parent nodes can be done with address computation (2n, 2n+1, n/2). In an implementation, the Key is a 32-bit value representing a future time. The Value is the node index on the other tile in the core group. In one example, it is a 32-bit value, but in other examples it could be limited to 16-bits to save memory. In order to handle up to four million packets per second on a 750 MHz core, the priority queue may perform each operation (Insert, Remove or Insert+Remove) in less than 200 cycles, in one implementation. A 32K L-2 cache can hold up to 4K priority queue entries. A larger priority queue can result in some spilling from the cache. All nodes in the rate limiter core may be implemented as priority queues.

Figure 11:
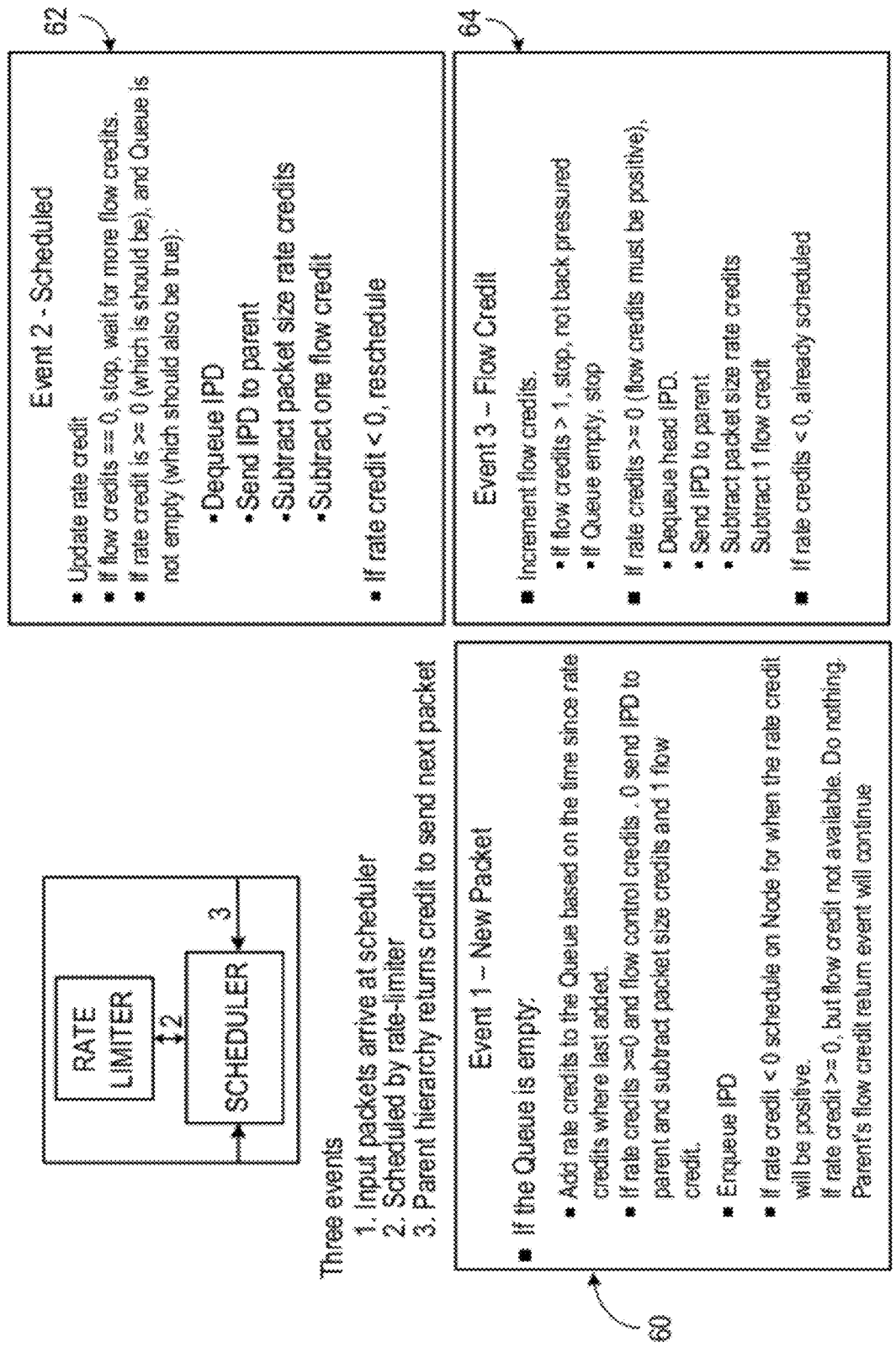
FIG. 11 is a block diagram of a rate-limiter and scheduler with actions that the scheduler may perform.

FIG. 11 is a block diagram of a rate-limiter and scheduler with actions that the scheduler may perform. In general, input packets may arrive at the scheduler (60), the scheduler may schedule the packet (62), and the scheduler may receive a credit from the parent to send the next packet (64). When a new packet arrives at a queue, rate credits may be added to the queue if the queue is empty based on the time since rate credits were last added. If the rate credit balance is greater than or equal to zero and the flow control credit balance is greater than zero, the IPD can be sent to the parent node, and the rate credit balance can be decremented by a packet size rate number of credits; also, one flow credit can be subtracted from the flow credit balance. The IPD can be enqueued (that is, added to the queue). If, on the other hand, the rate credit balance is negative, the priority queue may be scheduled for when the rate credit balance will again be positive. If the rate credit is non-negative but a flow credit is not available, the process may wait for an acknowledgement or wake-up call from the parent node.

A process that can be executed by the scheduler to schedule a packet includes updating the rate credit balance. If the flow credit balance is equal to zero, the scheduler may delay and wait to receive more flow credits from the parent node. If the rate credit balance is positive (which it typically may be) and the queue is not empty, the head IPD may be dequeued (that is, removed from the queue) and sent to the parent node. A number of rate credits equal to the packet size of the sent packet may be subtracted from the rate credit balance, and one flow credit may be subtracted from the flow credit balance. If the rate credit balance is negative, the packet may be rescheduled.

When a parent node sends a flow control credit, the scheduler may receive the credit and increment the flow credit balance. If the flow credit balance is greater than one, this may be an indication that back pressure is not being applied by the parent node. If the queue is empty, the process may stop. If the flow credit balance is greater than or equal to zero, a head IPD may be dequeued and sent to the parent node. A number of rate credits equal to the packet size of the sent packet may be subtracted from the rate credit balance, and one flow credit may be subtracted from the flow credit balance. If the rate credit balance is negative, then the packet is already scheduled.

Figure 12:
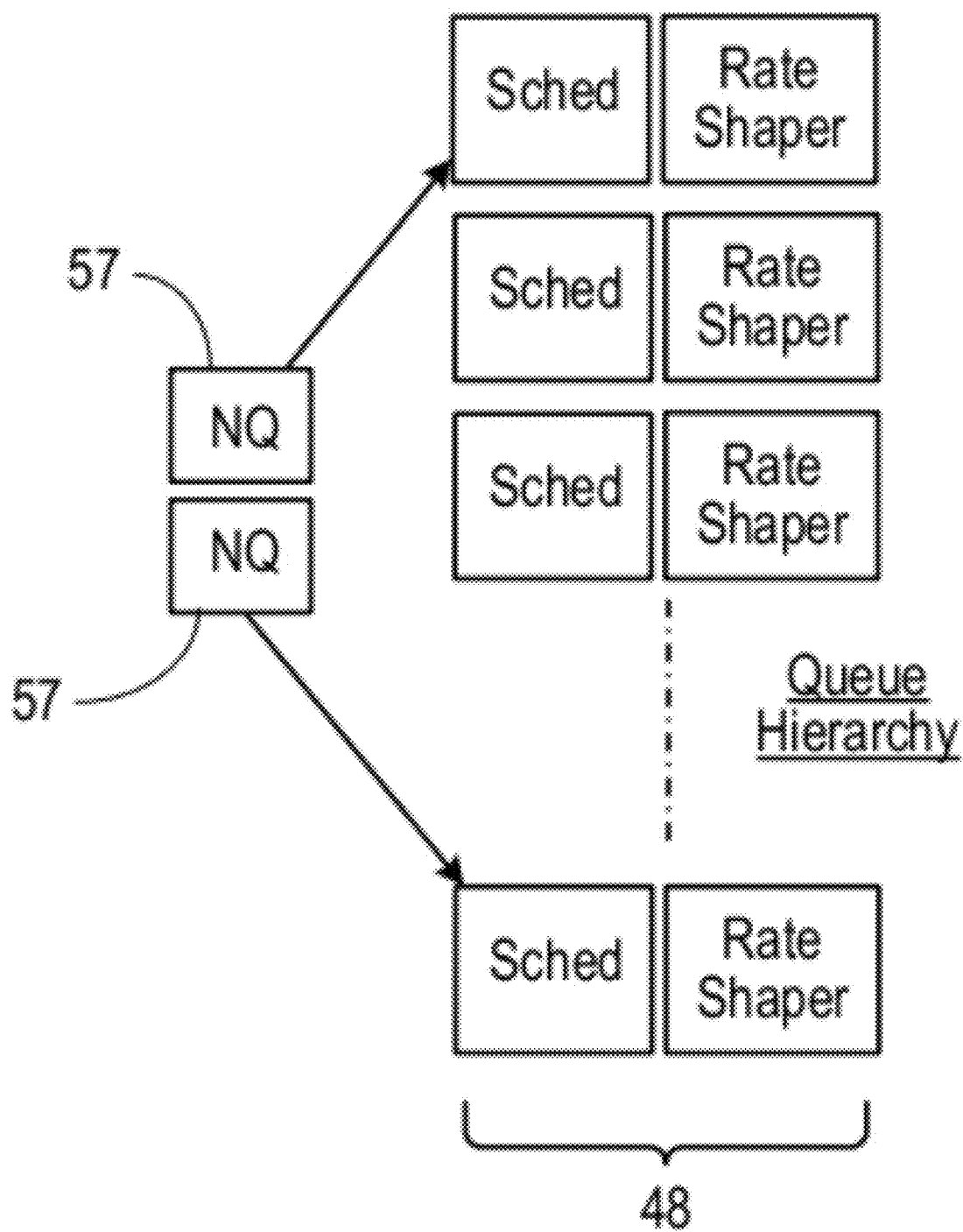
FIG. 12 is a block diagram of queue hierarchy nodes.

FIG. 12 is a block diagram of queue hierarchy nodes. As described above, queue nodes 48 may represent a first level of nodes in a hierarchy of nodes. The queue nodes 48 can maintain queues (e.g., FIFOs) of input packet descriptors. These queues can be stored in off-chip memory. The NQ tiles 57 may accept an input stream of packet descriptors and distribute them to the core group on which the queue node is mapped. In an example implementation, queues may be mapped to core groups so that each core group is supporting less than 4K queues with a total bandwidth of 4 million packets per second, or one queue with greater than 4 million packets per second. The packets may be stored outside of the queuing chip. The queuing chip may only handle packet descriptors, which may include queue number, packet handle and packet size, according to an implementation.

Call setup refers to any changes to the hierarchy of nodes, such as changing a node's rate, its parent node, its priority level with its parent, or any of its child nodes changing. Any change could require a new mapping of nodes to core groups. This can either be done by a completely new configuration, or by incremental changes to the configuration. Adding a "call" implies adding a new flow and making an incremental change to the node hierarchy. Thus, in some cases, the mapping of nodes to cores occurs before processing begins at "runtime" (e.g., before the packets have been received into queues), and in some cases at least some of the mapping occurs after processing has already begun (e.g., after at least some of the packets have been processed in processor cores that have already been mapped).

In an implementation, during call setup, flows may be assigned to specific nodes and the sum of rates on core groups may be balanced. In some cases, one or more flows may be reassigned to accommodate a high-rate node since if a node is added to a core group, that core group might not be able to process all the nodes it now has, so some of them may need to be moved to another core group. A rate-limiter may support rate shaping. In an implementation, each node may support over-subscription, and priority levels of low priority, high priority, and strictly high priority. Calculations may take packet size into account in some implementations.

Figure 13:
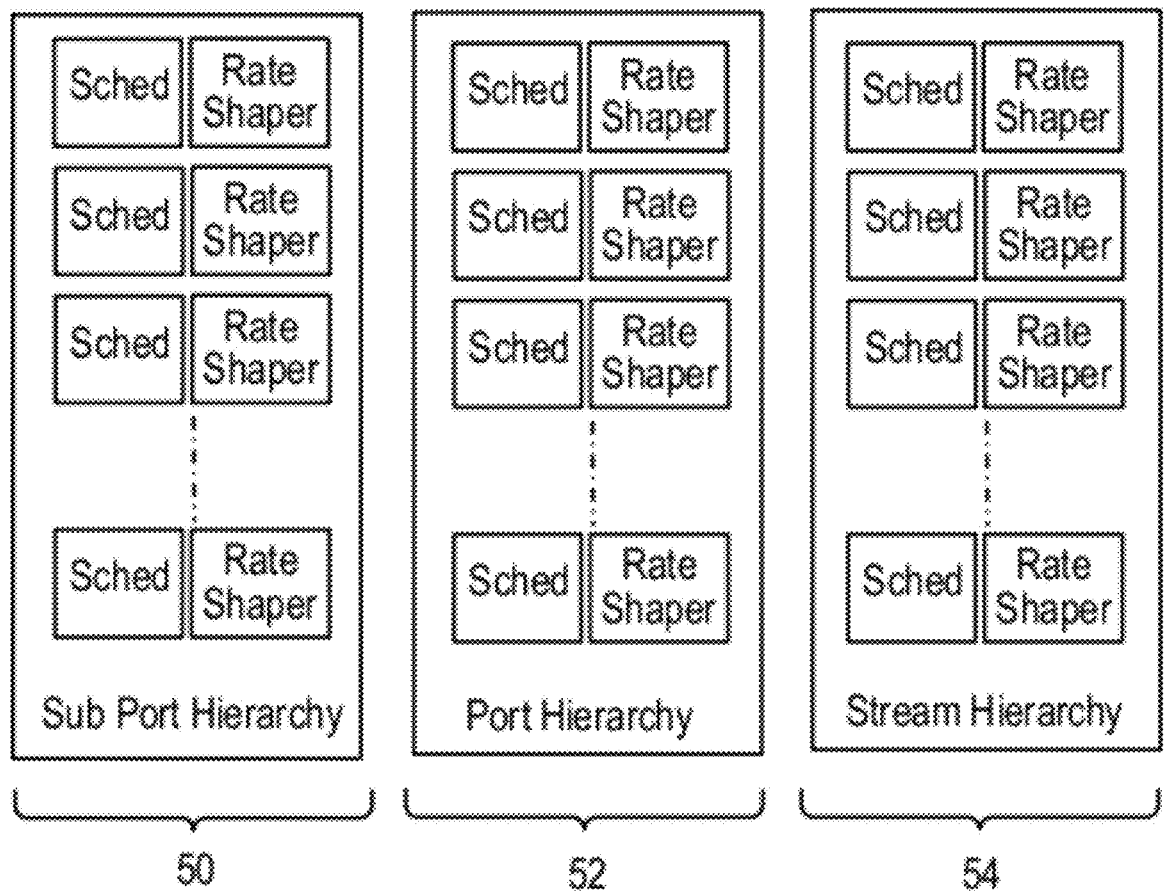
FIG. 13 is a block diagram of hierarchy nodes.

FIG. 13 is a block diagram of hierarchy nodes, including sub-port nodes 50, port nodes 52 and stream nodes 54. As described above, these node groups may represent second, third and fourth levels of nodes in a hierarchy of nodes. Each queue, sub-port and port node may have a parent node to which it sends all of its packet descriptors. Stream nodes may send packet descriptors to "DQ" Cores, which may send the packet descriptors off of the queuing chip. Each sub-port 50, port 52 and stream 54 node may allocate two packet descriptor buffers for each of its child nodes, according to an implementation. Credit-based flow control can be implemented between the child nodes and the parent node. In an implementation, each node has at most one parent node. There can be multiple queues of packet descriptors maintained in each node, such as one, two, three, four, etc. In an implementation, two queues, having priorities "high" and "low," may be implemented. The packet descriptor may be added to the end of the queue for its specified priority. The priority may be specified by the child node and included in the message with the packet descriptor.

Flow call setup tasks can include binding child nodes to parent nodes, setting a rate limit per node, and reassigning flows to accommodate high-rate nodes. In one exemplary implementation, a rate-limiter and scheduler can support 4 k flows at 4 Mpps, and support one flow at 16.67 Mpps. Packet size may be used during calculations. In an implementation, each node may support over-subscription, and priority levels of low priority, high priority, and strictly high priority.

Figure 14:
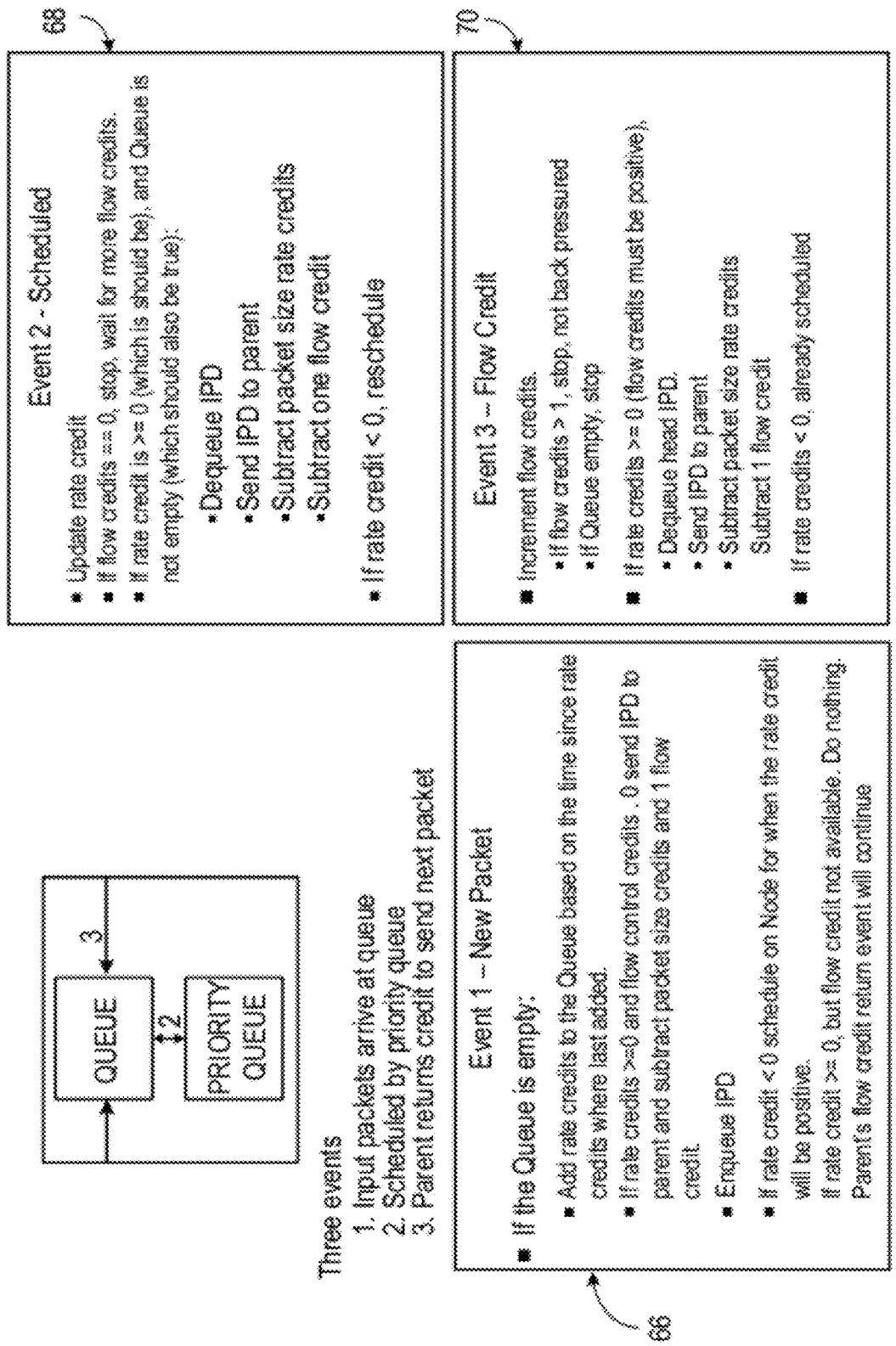
FIG. 14 is a block diagram of a queue and priority queue with actions that the queue may perform.

FIG. 14 is a block diagram of a queue and priority queue with actions that the queue may perform. FIG. 14 shows node processor details. In general, input packets may arrive at a queue (66), the priority queue may schedule the packet (68), and the queue may receive a credit from the parent to send the next packet (70). When a new packet arrives at a queue, rate credits may be added to the queue if the queue is empty based on the time since rate credits were last added. If the rate credit balance is greater than or equal to zero and the flow control credit balance is greater than zero, the IPD can be sent to the parent node, and the rate credit balance can be decremented by a packet size rate number of credits; also, one flow credit can be subtracted from the flow credit balance. The IPD can be enqueued. If, on the other hand, the rate credit balance is negative, the priority queue may be scheduled for when the rate credit balance will again be positive. If the rate credit is non-negative but a flow credit is not available, the process may wait for an acknowledgement or wake-up call from the parent node.

A process that can be executed by the queue to schedule a packet includes updating the rate credit balance. If the flow credit balance is equal to zero, the scheduler may delay and wait to receive more flow credits from the parent node. If the rate credit balance is positive (which it typically may be) and the queue is not empty, the head IPD may be dequeued and sent to the parent node. A number of rate credits equal to the packet size of the sent packet may be subtracted from the rate credit balance, and one flow credit may be subtracted from the flow credit balance. If the rate credit balance is negative, the packet may be rescheduled.

When parent node sends a flow control credit, the scheduler may receive the credit and increment the flow credit balance. If the queue is empty, the process may stop. If the flow credit balance is greater than or equal to zero, head IPD may be dequeued and sent to the parent node. A number of rate credits equal to the packet size of the sent packet may be subtracted from the rate credit balance, and one flow credit may be subtracted from the flow credit balance. If the rate credit balance is negative, then the packet is already scheduled.

2 Tiled Circuit Architecture Overview

The following is example of a tiled circuit architecture that can be used to implement the packet scheduling techniques.

Figure 15:
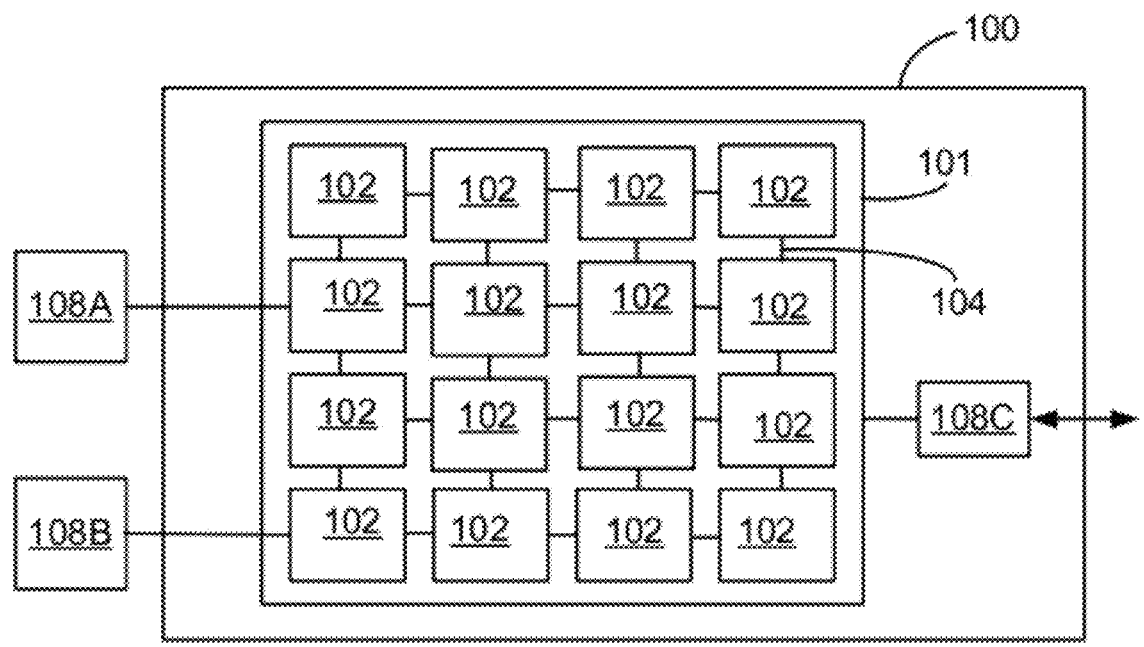
FIG. 15 is a block diagram of a tiled integrated circuit.

Referring to FIG. 15, an integrated circuit 100 (or "chip") includes an array 101 of interconnected tiles 102. Each of the tiles 102 includes a processor (or "processor core") and a switch that forwards data from other tiles to the processor and to switches of other tiles over data paths 104. In each tile, the switch is coupled to the processor so that data can be sent to or received from processors of other tiles over the communication fabric formed by the switches and data paths. The integrated circuit 100 includes other on-chip circuitry such as input/output (I/O) interface circuitry to couple data in and out of the circuit 100, and clock distribution circuitry to provide clock signals to the processors of the tiles.

The example of the integrated circuit 100 shown in FIG. 15 includes a two-dimensional array 101 of rectangular tiles with data paths 104 between neighboring tiles to form a mesh network. The data path 104 between any two tiles can include multiple "wires" (e.g., serial, parallel or fixed serial and parallel signal paths on the IC 100) to support parallel channels in each direction. Optionally, specific subsets of wires between the tiles can be dedicated to different mesh networks that can operate independently.

In some examples, the network include paths that extend to diagonal neighbors or to tiles that are multiple rows or columns away. Other examples include higher dimensional mesh topologies. For example, multiple layered integrated circuits or other three-dimensional configurations can be used to form networks in which the connections form a cube of network nodes. In some implementations, a switch coupled to a processor forwards data to and from the processor or between neighboring processors over data paths of a one-dimensional interconnection network such as ring network.

The data paths 104 from one or more tiles at the edge of the network can be coupled out of the array of tiles 101 (e.g., over I/O pins) to an on-chip device 108A, an off-chip device 108B, or a communication channel interface 108C, for example. Multiple wires of one or more parallel channels can be multiplexed down to a fewer number of pins or to a serial channel interface. For example, the wires for one or more channels can be multiplexed onto a high-speed serial link (e.g., SerDes, SPIE4-2, or SPIE5) or a memory controller interface (e.g., a memory controller for DDR, QDR SRAM, or Dynamic RAM). The memory controller can be implemented, for example, off-chip or in logic blocks within a tile or on the periphery of the integrated circuit 100.

The following exemplary implementations are described in the context of tiles that each have the same structure and functionality. Alternatively there can be multiple "tile types" each having different structure and/or functionality. For example, tiles that couple data off of the integrated circuit 100 can include additional circuitry for I/O functions. Tiles are not necessarily arranged in a regular rectilinear array.

Figure 16A:
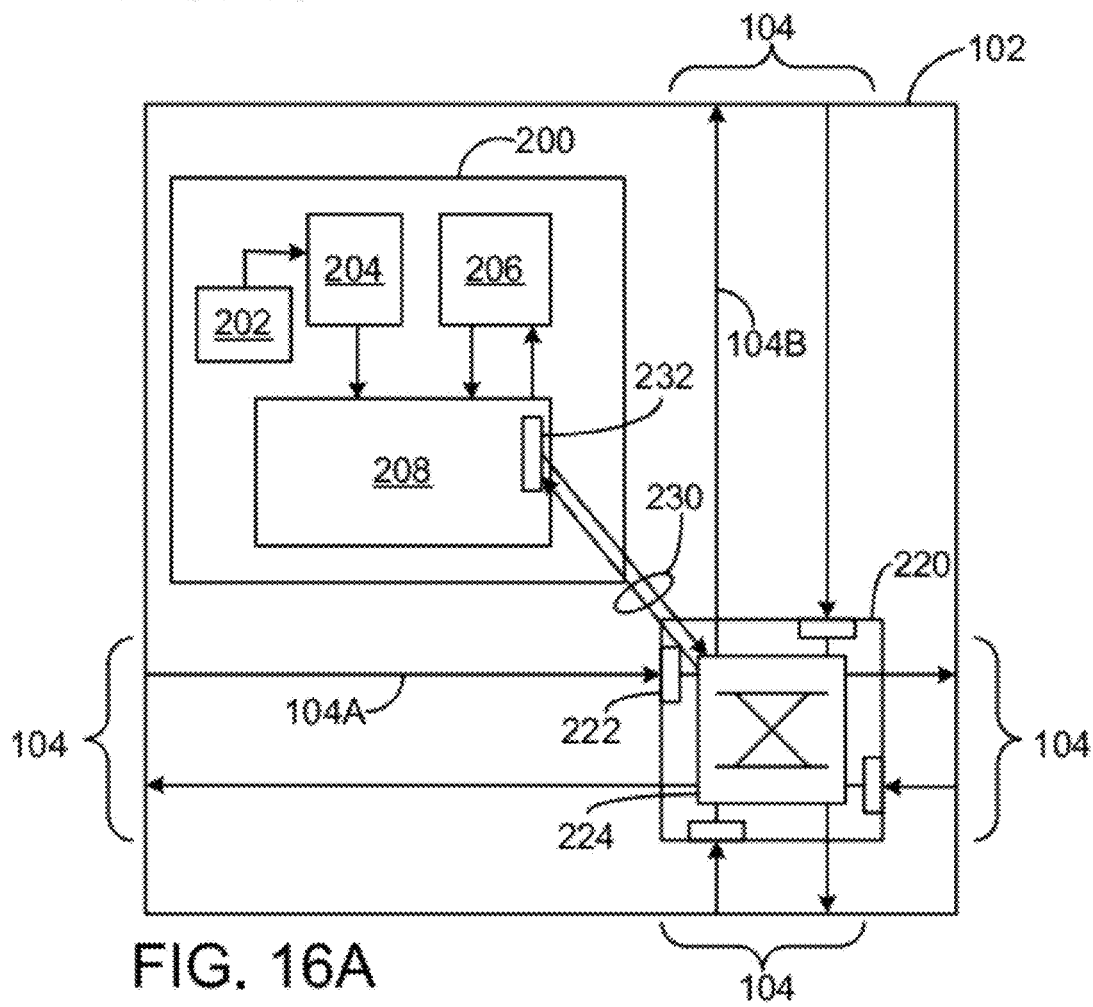
FIG. 16A is a block diagram of a tile.

Referring to FIG. 16A, a tile 102 includes a processor 200, a switch 220, and sets of incoming wires 104A and outgoing wires 104B that form the data paths 104 for communicating with neighboring tiles. The processor 200 includes a program counter 202, an instruction memory 204, a data memory 206, and a pipeline 208. Either or both of the instruction memory 204 and data memory 206 can be configured to operate as a cache for off-chip memory. The processor 200 can use any of a variety of pipelined architectures. The pipeline 208 includes pipeline registers, functional units such as one or more arithmetic logic units (ALUs), and temporary storage such as a register file. The stages in the pipeline 208 include, for example, instruction fetch and decode stages, a register fetch stage, instruction execution stages, and a write-back stage. Whether the pipeline 208 includes a single ALU or multiple ALUs, an ALU can be "split" to perform multiple operations in parallel. For example, if the ALU is a 32-bit ALU it can be split to be used as four 8-bit ALUs or two 16-bit ALUs. The processor 200 can include other types of functional units such as a multiply accumulate unit, or a vector unit.

The processor 200 can be multithreaded and/or have capabilities of a Very Long Instruction Word (VLIW) processor, a superscalar processor, or a vector processor. A VLIW processor can issue multiple instructions based on a stream of macro instructions including subinstructions designated to be executed concurrently by a compiler. A superscalar processor can issue multiple instructions by partitioning one or more instruction stream at run time to multiple functional units. A vector processor can execute instructions using multiple functional units to operate on respective components of data. A multithreaded processor can execute multiple streams of instructions (or threads) within different respective functional units, and/or within a common time-shared functional unit by switching contexts.

In some examples, the processor 200 is a coarse grain multithreaded (CGMT) processor that switches contexts on long latency events such as cache misses to memory or synchronization faults. A multithreaded processor in a tile may also switch contexts when it has to wait on the a network port. In some examples, the processor 200 is a fine grain multithreaded (FGMT) processor that switches contexts every cycle or every few cycles whether there is a long latency event or not. In some examples, the processor 200 is a simultaneous multithreaded (SMT) processor that includes multiple functional units (e.g., in multiple pipelines) to execute instructions from multiple threads without necessarily needing to switch contexts, such as in a superscalar processor.

In some examples, the networks in the tiled array are configured to enable network ports to be shared among multiple threads running in multithreaded processors in the tiles. For example, the networks allow data for different threads to be interleaved such that, if a processor switches context while a first thread is writing to or reading from a network port, the second thread can also write to or read from the network port.

The switch 220 includes input buffers 222 for temporarily storing data arriving over incoming wires 104A, and switching circuitry 224 (e.g., a crossbar fabric) for forwarding data to outgoing wires 104B or the processor 200. The input buffering provides pipelined data channels in which data traverses a path 104 from one tile to a neighboring tile in predetermined number of clock cycles (e.g., a single clock cycle). This pipelined data transport enables the integrated circuit 100 to be scaled to a large number of tiles without needing to limit the clock rate to account for effects due to wire lengths such as propagation delay or capacitance. (Alternatively, the buffering could be at the output of the switching circuitry 224 instead of, or in addition to, the input.)

2.1 Switch Operation

Continuing to refer to FIG. 16A, a tile 102 controls operation of a switch 220 using either the processor 200, or separate switch processor dedicated to controlling the switching circuitry 224. Separating the control of the processor 200 and the switch 220 allows the processor 200 to take arbitrary data dependent branches without disturbing the routing of independent messages passing through the switch 220.

In some implementations, the switch 220 includes a switch processor that receives a stream of switch instructions for determining which input and output ports of the switching circuitry to connect in any given cycle. For example, the switch instruction includes a segment or "subinstruction" for each output port indicating to which input port it should be connected. In some implementations, the processor 200 receives a stream of compound instructions with a first instruction for execution in the pipeline 208 and a second instruction for controlling the switching circuitry 224.

The switch instructions enable efficient communication among the tiles for communication patterns that are known at compile time. This type of routing is called "static routing." An example of data that would typically use static routing are operands of an instruction to be executed on a neighboring processor.

The switch 220 also provides a form of routing called "dynamic routing" for communication patterns that are not necessarily known at compile time. In dynamic routing, circuitry in the switch 220 determines which input and output ports to connect based on the data being dynamically routed (for example, in header information). A tile can send a message to any other tile by generating the appropriate address information in the message header. The tiles along the route between the source and destination tiles use a predetermined routing approach (e.g., shortest Manhattan Routing). The number of hops along a route is deterministic but the latency depends on the congestion at each tile along the route. Examples of data traffic that would typically use dynamic routing are memory access traffic (e.g., to handle a cache miss) or interrupt messages.

The dynamic network messages can use fixed length messages, or variable length messages whose length is indicated in the header information. Alternatively, a predetermined tag can indicate the end of a variable length message. Variable length messages reduce fragmentation.

The switch 220 can include dedicated circuitry for implementing each of these static and dynamic routing approaches. For example, each tile has a set of data paths, buffers, and switching circuitry for static routing, forming a "static network" for the tiles; and each tile has a set of data paths, buffers, and switching circuitry for dynamic routing, forming a "dynamic network" for the tiles. In this way, the static and dynamic networks can operate independently. A switch for the static network is called a "static switch"; and a switch for the dynamic network is called a "dynamic switch." There can also be multiple static networks and multiple dynamic networks operating independently. For example, one of the dynamic networks can be reserved as a memory network for handling traffic between tile memories, and to/from on-chip or off-chip memories. Another network may be reserved for data associated with a "supervisory state" in which certain actions or resources area reserved for a supervisor entity.

As described above, the switch 220 is coupled to the processor 200 over processor coupling wires 230. For fast (e.g., low latency) communication between tiles of neighboring processors, the coupling wires 230 can be integrated directly into the pipeline 208. The processor 200 can communicate with the switch 220 using distinct opcodes to distinguish between accesses to the static and dynamic network ports. Alternatively, the instructions can use register names to refer to switch ports.

For example, the processor can send or receive data by writing to or reading from a register interface that is directly mapped to the input buffers 222 of the switch 220. For data going to or coming from the processor 200, a switch instruction indicates that the switch 220 should couple data to or from a selected register or bypass path of the pipeline 208 over a register mapped pipeline integrated switch interface 232. This pipeline integration allows data to be available to the switch 200 the moment an instruction is executed and the register value is available. In the next cycle the same data could appear at an input buffer of another tile.

Figure 16B:
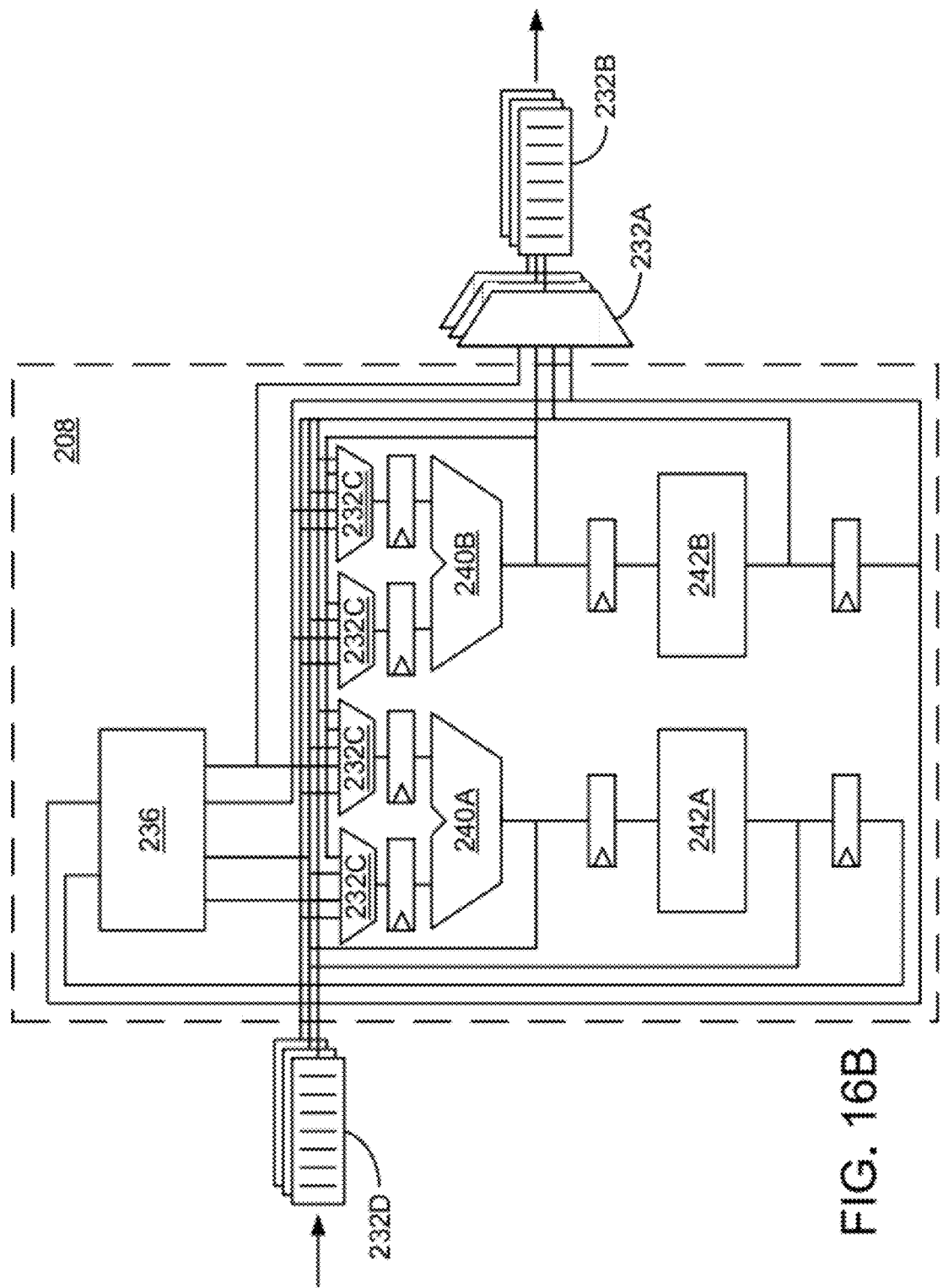
FIG. 16B is a block diagram of a pipeline.

Referring to FIG. 16B, a register mapped pipeline integrated switch interface 232 (FIG. 16A) includes a set of multiplexers 232A and output buffers 232B coupled to different output ports of the static or dynamic switch. The switch interface also includes a set of multiplexers 232C that select data from a register file 236 or any of a set of input buffers 232D coupled to different input ports of the static or dynamic switch. The multiplexers 232C feed the inputs to logic units 240A and 240B. The output buffers 232B and input buffers 232D are mapped to the name space of the register file 236. When the processor 200 (see FIG. 16A) reads from a register name mapped to a given switch port, data is taken from the corresponding input buffer 232D. When the processor 200 writes to a register name mapped to a given switch port, data is inserted into the corresponding output buffer 232B. The multiplexers 232A are able to select data from any pipeline stage (e.g., before or after the logic units 240A and 240B, or before or after functional units 242A and 242B) as soon as the value is available. If the processor 200 loads an instruction to read from an empty input buffer 232D or to write to a full output buffer 232B, the processor 200 will stall until it is able to proceed.

Figure 17A:
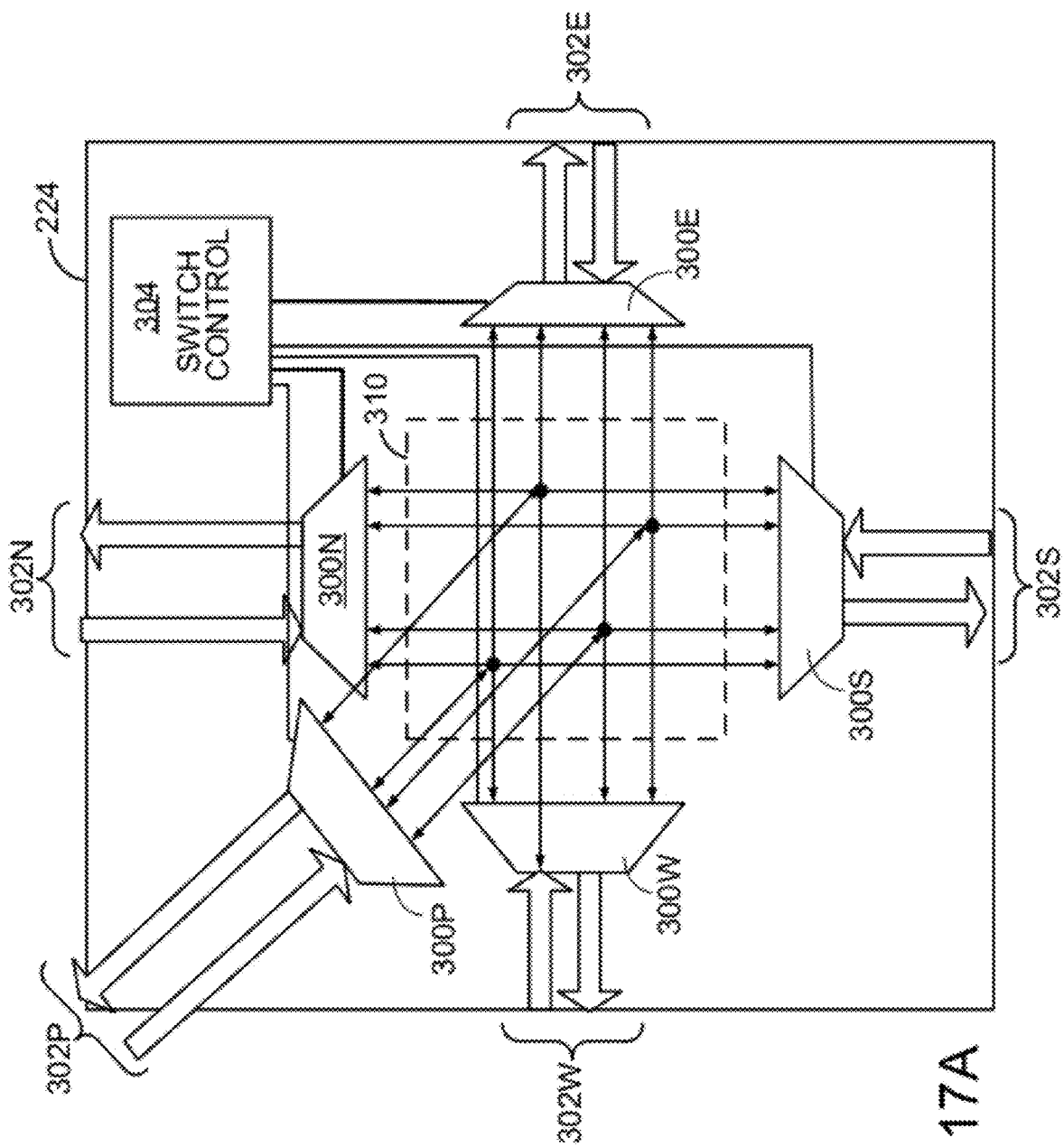
FIGS. 17A-17C are block diagrams of switching circuitry.

Referring to FIG. 17A, switching circuitry 224 includes five multiplexers 300N, 300S, 300E, 300W, 300P for coupling to the north tile, south tile, east tile, west tile, and local processor 200, respectively. Five pairs of input and output ports 302N, 302S, 302E, 302W, 302P are connected by parallel data buses to one side of the corresponding multiplexer. The other side of each multiplexer is connected to the other multiplexers over a switch fabric 310. In alternative implementations, the switching circuitry 224 additionally couples data to and from the four diagonally adjacent tiles having a total of 9 pairs of input/output ports. Each of the input and output ports is a parallel port that is wide enough (e.g., 32 bits wide) to couple a data word between the multiplexer data bus and the incoming or outgoing wires 104A and 104B or processor coupling wires 230.

A switch control module 304 selects which input port and output port are connected in a given cycle. The routing performed by the switch control module 304 depends on whether the switching circuitry 224 is part of the dynamic network or static network. For the dynamic network, the switch control module 304 includes circuitry for determining which input and output ports should be connected based on header information in the incoming data.

Figure 17B:
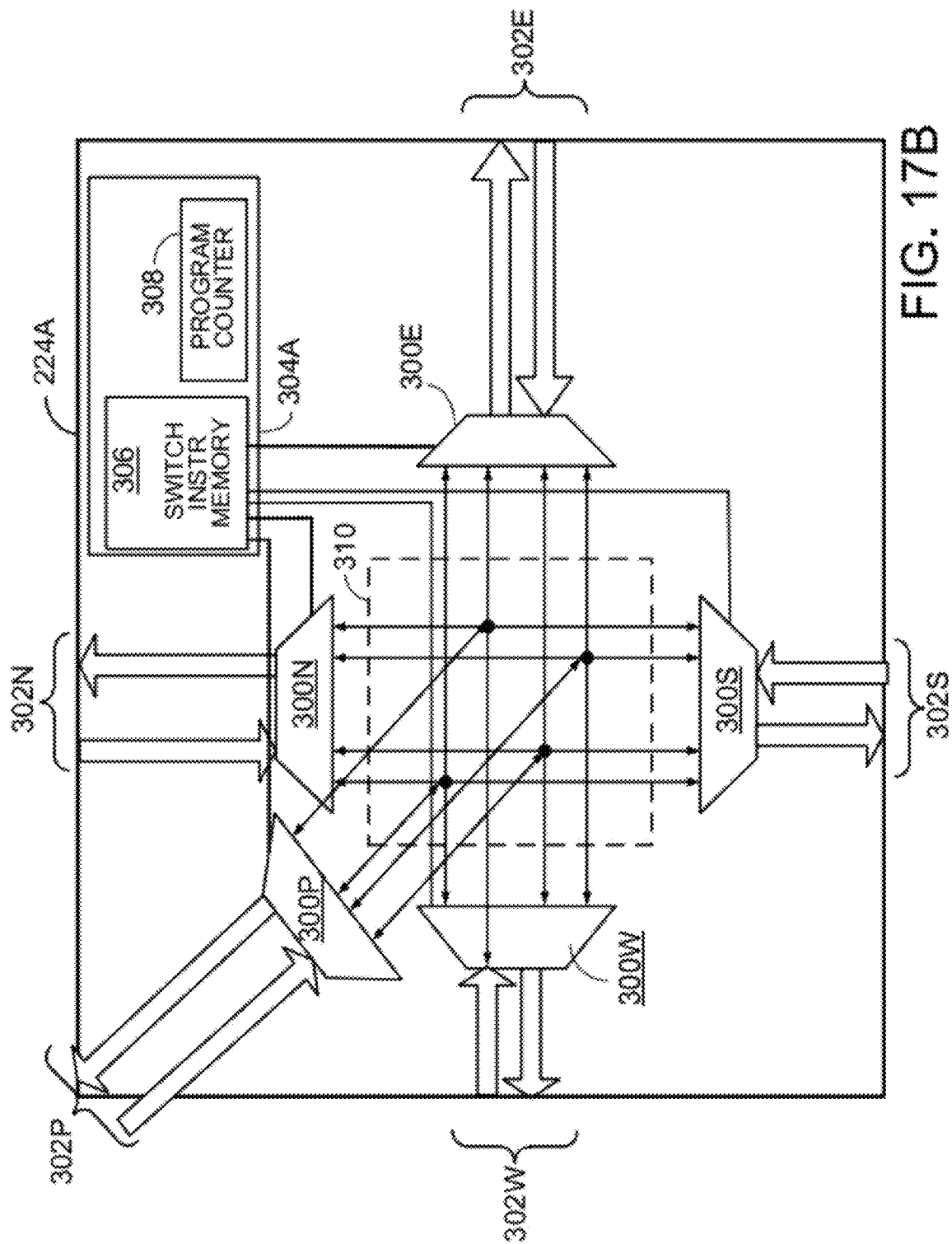

Referring to FIG. 17B, for the static network, the switch control module 304A of switching circuitry 224A includes a switch instruction memory 306 storing switch instructions that indicate which input and output ports should be connected. A switch instruction stored in the switch instruction memory 306 includes a subinstruction for each output port (in this case, five subinstructions). Each subinstruction represents a multiplexer select value which routes one of five input ports to the corresponding output port.

A program counter 308 steps through the switch instructions, interpreting control information (e.g., a condition code) in the switch instructions to perform actions such as branches or jumps based on program control flow. In a given clock cycle, the switch control module 304A can enable the multiplexers to move data independently onto any output port from any input port, including multicasting an input port to all output ports, as long as two input ports are not connected to the same output port in the same clock cycle.

The switch control module 304A is able to function as a switch processor with or without an ALU and registers. The switch control module 304A can include an ALU and registers to allow in-switch processing of in-flight messages. Optionally, the switch control module 304A can include other components such as a floating point arithmetic unit, or bit shifter, for example, to perform additional functions. In some examples, the switch control module 304A can be a VLIW-type processor and can be multithreaded.

Figure 17C:
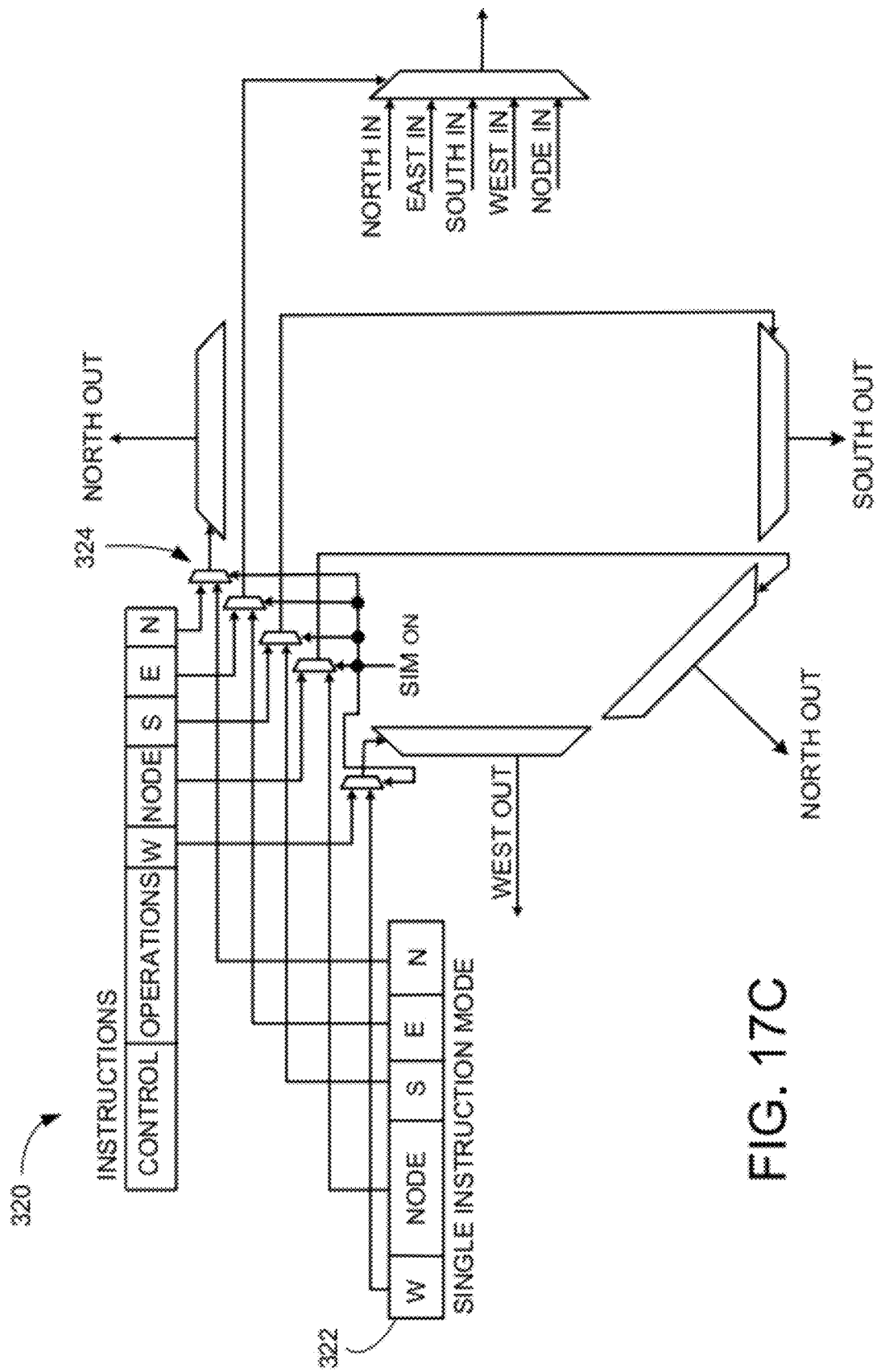

Referring to FIG. 17C, a static network switch 320, which can be included in switch 220 in FIG. 16A, is configured in "single instruction mode." In single instruction mode, one instruction is used to control the multiplexers of the switch over many cycles. When data arrives at one switch input port, that data is routed according to the instruction stored in the single instruction buffer 322 independent of the availability of data a the other switch input ports. In this example, the switch 320 includes multiplexers 324 for turning single instruction mode on or off. The control signals for the multiplexers 324 are controlled by the processor 200 (e.g., mapped to a register name space of the processor 200).

When single instruction mode is on, data is routed according to the single instruction buffer 322. When single instruction mode is off, data is routed according to instructions in the switch instruction buffer 346. To save power in single instruction mode, switches are able to turn off circuitry such as a switch instruction fetch unit, and a switch instruction decode logic. Power can also be saved by reducing the size of the single instruction buffer 322 (e.g., to the size of a single instruction). In some implementations the size of the single instruction buffer 322 can be reduced to only enough bits to represent the coupling between the input and output ports (e.g., 2, 3, or 4 bits).

When utilizing single instruction mode, the individual output directions are independent of each other and there are no synchronization requirements. For example, if the single instruction specifies a route from north to south and a route from east to west, and data arrives on the east port, but no data arrives on the north port, the switch will route the data from east to west independent of data being available on the north or ports. With multiple static switches configured to use single instruction mode, the static network can be utilized to construct a dedicated physical channel across the integrated circuit.

The switches 220 include hardware and software mechanisms for providing flow control to ensure that data arriving at a full tile input buffer does not overwrite old data still pending in the buffer or cause deadlock. A switch 220 can include circuitry to detect full/empty states of buffers, and some of the wires in the data paths 104 of the static or dynamic network can be dedicated to communicating flow control information. In the dynamic network, the traffic patterns are unpredictable and there is a need for techniques for deadlock avoidance or deadlock detection and recovery. For example, buffers that become full can be overflowed into memory coupled to the switch 220 or the processor 200, or over one of the networks to off-chip memory. In the static network, the traffic patterns are controlled by the processing of switch instructions in a way that ensures correct delivery of data and avoids deadlock.

In a first approach to flow control for the static network, a processor 200 or switch 220 stalls if it is executing an instruction that attempts to read data from an empty input buffer 222 or from an empty processor output buffer 236, or send data to a tile with a full input buffer 222. This approach ensures correctness in the presence of timing variations introduced by dynamic events such as dynamic memory references and I/O operations.

In a second approach to flow control for the static network, the switch 220 can continue to process subinstructions of a macro switch instruction if data has arrived at the corresponding input buffers, and delay processing subinstructions if the corresponding input buffer is empty. The switch 220 is also notified that an input buffer at a connected tile that receives data from a given output port is full (e.g., via a full/empty bit). The switch 220 is able to continue processing switch instructions for other output ports while suspending only that output port.

In one implementation of this second approach, there is a switch instruction memory 306 (e.g., separate memory units or separate queues within a single memory unit) and program counter 308 for each output port to enable the switch 220 to operate independently on a separate stream of switch instructions for respective output ports. For example, the switch 220 can extract the instruction streams for respective output ports from an incoming macro switch instruction stream that includes subinstructions for the respective output ports. The condition code from a macro switch instruction can be included with each corresponding subinstruction of the extracted instruction streams. Alternatively, each subinstruction can include its own condition code based on the appropriate program logic. This second approach allows data that can be forwarded without sacrificing correctness to be forwarded without further delay.

2.2 Additional Circuitry

In some examples, a tile can include additional circuitry embedded within or coupled to the processor 200 and/or switch 220. The configuration of the circuitry in a tile can be controlled by local control information stored in the tile. For example, a module in the tile can be turned on or off or configured into a variety of modes based on the state of a "mode indicator" (e.g., one or more bits) stored in a register or other memory store.

A tile 102 can include various types of memory modules to serve as the instruction memory 204, data memory 206, or as a local memory store for other types of information such as control information for the tile. There can be a small SRAM bank in each tile in addition to a large SRAM bank. There can also be a larger DRAM bank in each tile. Each tile can have mode indicators used to select among these banks Any of the memory modules can be treated as a cache for a larger memory store outside the tile 102 or the integrated circuit 100. Such external memory (e.g., DRAM) is accessible over high bandwidth paths of one or more dynamic networks. The amount of memory can be chosen to roughly balance the areas devoted to processing and memory, and to match the memory access time and the processor clock.

A tile 102 can include Reconfigurable Logic (RL) that takes operands from registers and writes them back to registers after performing reconfigurable logic operations. The RL can be used for bit-level (or "gate-level") logic, and also for multi-bit-level (e.g., byte-level) logic. The operations performed by the RL can be specified by logic-level instructions supplied to the RL.

Functions such as virtual address translation, caching, global shared memory and memory protection can be implemented by any combination of hardware and software (e.g., processor instructions). A tile 102 can include a translation lookaside buffer (TLB) to translate virtual addresses as they come out of the processor 200 on each tile 102. A mode bit can turn off translation. The events such as cache miss or translation fault can trigger a trap or interrupt to the processor 200, so that the processor 200 can handle it in software. For example, there can be multiple trap lines to the processor 200. Alternatively, there are few trap lines, but there is a trap vector that the processor 200 can access which encodes the type of trap that occurred. There is a mode indicator which can allow selecting whether the software or the hardware handles these events. A hardware cache tag file can export a hit/miss status to the software rather than stalling the processor pipeline.

In a processor 200 in which the switch 220 is integrated into the bypass paths of the processor pipeline 208, the translation is performed before the data is sent (or committed) to the switch (e.g., before being written into a switch buffer to be sent out on any one of the static or dynamic networks). In this way, if there is a translation fault, then the data is not sent and the instruction can be safely aborted. Otherwise, data for which there has been a translation fault could corrupt program execution if sent over a network.

More generally, the processor 200 is configured to delay committing data associated with a current instruction or a subsequent instruction to the switch until an operation associated with the current instruction or a previous instruction has completed. In a case in which a subinstruction within a VLIW instruction triggers a TLB access, the processor makes sure that the TLB access completes successfully before any of the subinstructions in the same VLIW instruction or future instructions are allowed to write into a network. For example, the processor ensures that the TLB access of a memory subinstruction is completed without the TLB suffering a fault, before any subsequent subinstruction (or subinstruction in the same instruction as the memory subinstruction) is allowed to write into a network port. If the TLB does suffer a fault, then subinstructions that are being executed in the same cycle as the TLB access are stalled. Similarly, instructions that are happening in later cycles will also be stalled until the TLB fault is handled successfully. For other subinstructions for which data is available to be sent over a network before the subinstruction is guaranteed to complete successfully, the processor delays sending the data over the network until the instruction completes or is guaranteed to complete successfully. The data may be included as part of the subinstruction (such as a virtual address) or in some way dependent on the execution of the subinstruction.

The processor 200 is also configured to allow certain instructions (or subinstructions) to proceed while waiting for a previous instruction to complete. For example, one type of instruction that may be delayed several cycles before completing is a load instruction that retrieves data from a memory address in an coupled memory device over the dynamic network (e.g., due to a cache miss or a non-cached memory access). In some cases the load instruction may also write the retrieved data to a network port. The processor 200 can execute certain subsequent instructions while the data is being retrieved without causing errors due to incorrect program order. However, if a subsequent instruction also writes to a network port, the processor stalls to prevent that instruction's data from being injected into the network before data from the previous load instruction.

Thus, one criterion used by the processor 200 to determine whether to stall a pipeline is to ensure that the order in which values enter a network port corresponds to the order of the instructions (or subinstructions). In some cases, instructions are allowed to proceed without stalling the pipeline due to an incomplete instruction (e.g., a load due to a cache miss that does not target a network port). In some cases, the pipeline is stalled preventing instructions that target a network port from proceeding until a previous instruction completes (e.g., a load due to a cache miss that also targets a network port). However, independent networks can be configured to not block each other. For example, being stalled on writing one network does not necessarily stall writing to another network.

3 Tiled Circuit Programming Overview

A software system for the tiled integrated circuit 100 includes a compiler that is able to schedule instructions in both time and space by generating both processor and switch instructions for arranging the static network. The compiler can also prepare messages to be sent over the dynamic network. The combination of the static network and the pipeline integration enables the compiler to orchestrate a calculation to be performed over multiple tiles with fast register-level communication between tiles. The software system can exploit both coarse-grained parallelism and fine-grained Instruction-Level Parallelism (ILP). In addition, the software system can exploit reconfigurable logic in each tile to construct operations that are uniquely suited for a particular application. This reconfigurable logic can be coded in a hardware description language such as Verilog or VHDL, or in a high-level language such as C.

The operating system (OS) for the integrated circuit 100 can include a Linux-like kernel or a similar kernel running on a single tile 102. Alternatively, the OS can be a distributed OS running on multiple tiles sending messages to each of the processes on each of the tiles.

The compiler can leverage the architectural features of the integrated circuit 100 by partitioning and scheduling ILP or data-level parallelism across the tiles. The compiler is able to automatically parallelize sequential applications across multiple tiles 102. For example, outer loops can be parallelized at a coarse-grained while inner loops can be parallelized at a fine grain, much as in a vectorizing compiler. When the compiler can identify commonly occurring instruction patterns or bit operations, they can be configured into special operations that will run in a single cycle using the reconfigurable logic.

Figure 18:
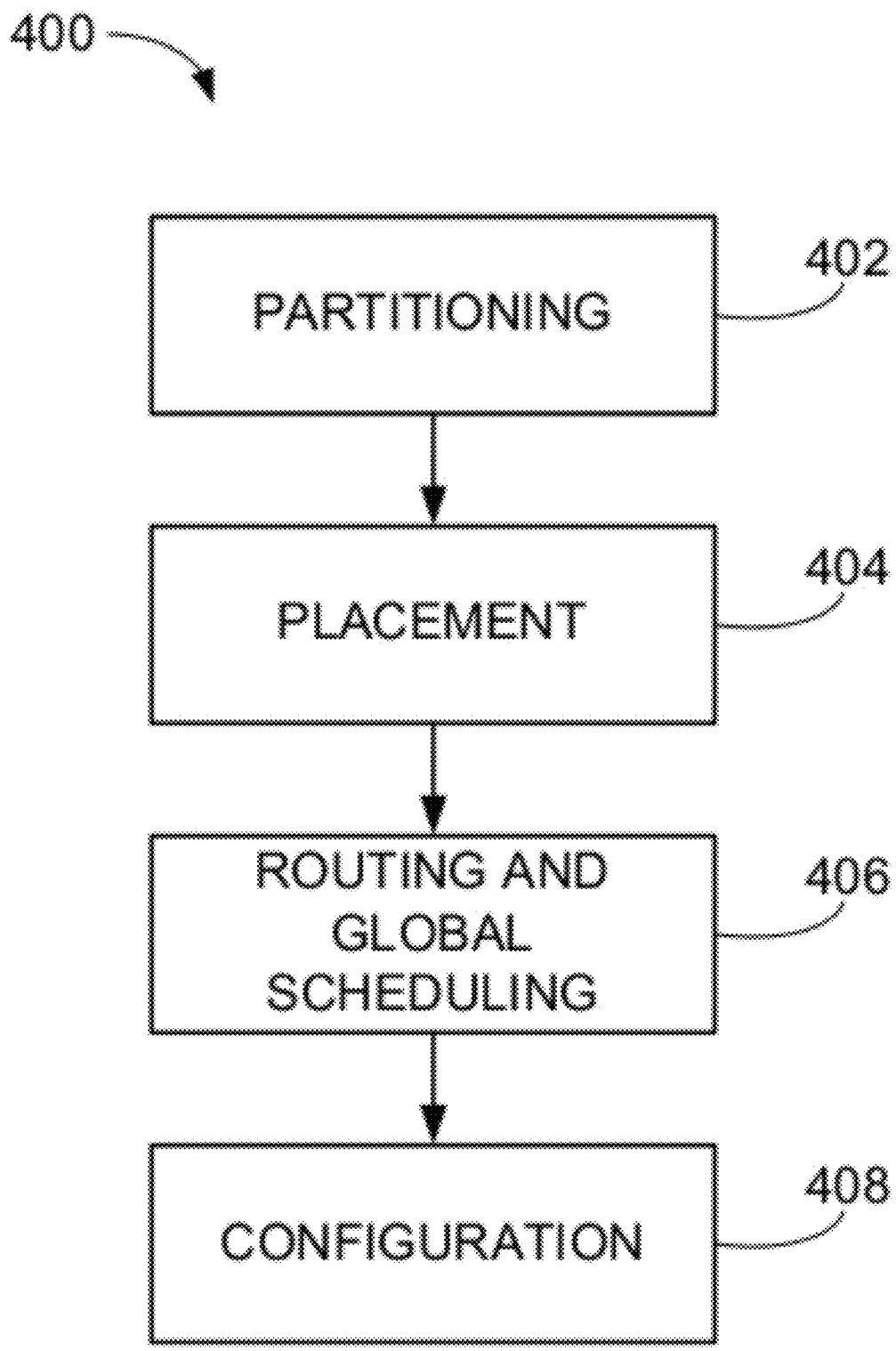
FIG. 18 is a flowchart for a compiling process.

Referring to FIG. 18, a compiling process 400 includes a number of stages. The compiler identifies and partitions for fine grain ILP in program by balancing the benefits of parallelism versus the overheads of communication and synchronization. In a partitioning phase 402, the compiler generates parallel code for a number of threads up to the number of tiles in the integrated circuit 100. In the partitioning phase 402, the compiler assumes an idealized fully-connected switch (an "ideal crossbar"), an unbounded number of virtual registers per tile, and symbolic data references. In a placement phase 404, the compiler removes the idealization of an ideal crossbar by selecting a one-to-one mapping from threads to physical tiles. The placement algorithm attempts to minimize a latency and bandwidth cost measure and can be, e.g., a variant of a VLSI cell placement algorithm. In a routing and global scheduling phase 406, the compiler allocates physical network resources with the goal of minimizing the overall estimated completion time of the program. The compiler output includes a program (e.g., a stream of instructions) for the processor 200 of each participating tile.

In an optional configuration phase 408, the compiler selects an application-specific configuration for reconfigurable logic to perform one or more custom operation. For each custom operation, the configuration compiler generates logic-level instructions for the reconfigurable logic and if necessary rewrites associated processor or switch instructions. For example, a compound operation involving multiple instructions is replaced by a call to the appropriate custom instruction using the reconfigurable logic. The compiler output includes a program (e.g., a stream of instructions) for each tile processor 200 and switch 220, and optional logic-level instructions.

Alternatively, the compiler can generate logic-level instructions based on a separate hardware description language program, as described in more detail below.

When the processor in the tile is able to exploit some amount of fine-grained ILP, for example, when the processor is a VLIW, multithreaded (CGMT, SMT, or FGMT), or superscalar processor, then the compiler has an additional challenge. In some cases the compiler schedules the available parallelism (e.g., ILP) across (1) several tiles, and (2) across the parallelism of afforded within a single tile (for example, over multiple functional units). When compiling instructions for an integrated circuit that includes tiles with VLIW processors, for example, the compiler is able to schedule the instructions in the VLIW processor within a tile at the same time that it is scheduling instructions across multiple tiles. The compiler is able to make a tradeoff as to where to schedule a given instruction—on the same tile using VLIW parallelism, or on another tile using inter-tile parallelism, for example. The compiler can do so, for example, by modifying the partitioning phase discussed previously. Instructions that are in the critical path of the program can be assigned to a single tile. Instructions that feed operand values directly into any of the instructions in the critical path, or instructions that consume operand values produced by critical path instructions, can be placed on the same tile to exploit VLIW parallelism. Instructions that are further away from the critical path instructions, or instructions on a different critical path can be placed on another tile. In general, code scheduled for a VLIW tiled architecture will result in fewer tiles being used than in an architecture that executes only one instruction in a given cycle.

4 Additional Features 4.1 Pipeline Integration

In general bypass paths in pipelines short circuit values from one pipeline stage to another without the need to transmit the values to the register file or to memory each time. The bypass paths in a processor are thus critical resources for shuttling values around between various stages such as ALUs, register files, load-store queues, writeback stages, and so on. As described above, a register mapped interface is able to integrate the switch 220 into the bypass paths of the processor pipeline 208. Register mapped interfaces allow the processor 200 to use register names to refer to buffers that couple data into or out of the static or dynamic networks. Values may be coupled from a processor bypass path to a switch output port, or values may be read from the switch into the processor bypass paths.

Integration of the switch 220 into the bypass paths of the pipeline 208 enables the values that are destined to the switch 220 from the processor 200 to be picked directly from the processor pipeline 208 as soon as they are produced. For example, data values from the pipeline 208 can be sent to switch buffers 232B directly from the processor's bypass paths, even before the values are written to the register file 236 (FIG. 16B) at a writeback stage.

If values going to the network are ordered, care should be taken when choosing which value to forward to the network in any given cycle. If "long-latency" instruction that requires the whole pipeline to compute writes to the network, and it is followed by a "short-latency" instruction that also writes to the network, but requires fewer pipeline stage to compute, then to preserve ordering of values to the network, the value from the short-latency instruction is delayed from reaching the network until the long-latency instruction has written to the network. Control logic is used to determine which value in the pipeline that targets the network is the oldest to preserve ordering of values going to the network. It is possible to use a reordering buffer or a unordered network to relax this strict ordering requirement.

The pipeline integrated switch enables a value computed by an ALU of a given tile to be used as an operand in a neighboring tile's ALU with extremely low latency, e.g., in 1 to 3 cycles, as opposed to 5 or 10 cycles, which might be the case if the value was picked from the pipeline in the writeback stage of the pipeline. This low latency transfer of single word operands between tiles is an important aspect of enabling an ILP (instruction level parallelism) compiler to compile programs written in sequential C, C++ or other high level languages to multiple tiles.

Register file size can be increased from the size used by other processors (which may have 8 to 32 registers), for example, to 64 or more registers, because some of the register name space is used up to name switch buffers.

In VLIW processors, multiple subinstructions in a macroinstruction may attempt to read or write to the switch buffers. If multiple subinstructions in a macroinstruction try to write to a register name mapped to the same switch buffer, there is a potential conflict. The compiler can avoid such conflicts in scheduling the VLIW instructions. Alternatively, the tile can serialize multiple writes into the switch buffers allowing the writes to take place sequentially without a conflict, as described in more detail below. Multiple instructions in a macroinstruction are able to read from the same switch buffer without a conflict.

When an outgoing value is coupled from the processor 200 to the switch 220, the processor instruction may include a switch register specifier denoting one of several output registers. The specified output register may be linked to a static coupled switch (with the OD mode indicator set to coupled mode), a static decoupled switch (with the OD mode indicator set to operand decoupling mode), or to a dynamic network switch.

For increased speed, the switch register specifier is able to directly specify a register of a neighboring processor. A direct name identifying the register can be included, or there can be a directional mode indicator in the instruction that allows the register name to be interpreted based on the name space of a neighboring tile. For example, a directional mode indicator can be 2 bits corresponding to a register in a tile in the east, west, north, or south direction. Directional mode indicators allow the name space of a register specifier to be inferred to be that of a neighboring tile. Particularly for a slow clocked system, it is useful to avoid a multi-hop near neighbor latency by using a directional mode indicator to enable a single-hop communication event from one tile to a neighboring tile.

Alternatively, instead of sending a processor value to a register on the same tile using a register specifier, or to a neighboring or other tile's register or ALU, a processor value can be sent to a memory using a memory specifier, or to an I/O port using an I/O specifier.

When an incoming value is coupled from the switch to the processor, the processor instruction may include a register specifier denoting one of several input registers from the switch. These input registers serve to synchronize the processor pipeline with the switch even if the switch is running in decoupled mode. There can be more input ports than just the 4 directions (north, south, east, and west). For example, there can be multiple networks, and there can also be communication paths forming "hyperlinks" that skip multiple tiles.

Another mode indicator called the Processor Switch Coupling (PSC) mode indicator indicates whether program counters of the processor 200 and switch 220 are to be coupled. If this PSC mode indicator is set, the processor and the switch program counters are coupled and the two are incremented synchronously. For example, both the processor and switch pipelines are stalled if either is stalled.

It is useful for some of these mode indicators, in particular, the directional mode indicators, to be linked to the clock speed of the integrated circuit 100. For example, a given mode may be more appropriate for a given clock speed. In some cases, a tile is allowed to transfer data over hyperlinks to non-neighbor processors (e.g., by allowing a compiler to have visibility of the hyperlinks) only when the clock speed is lower than a predetermined rate. This is because hyperlinks to tiles, which are normally two or more hops away in a two dimensional (east, west, south, north) mesh network, will traverse longer data paths. Data that traverses a longer data path will take longer to reach its destination. Therefore, in some cases, these longer delays limit the integrated circuit 100 to operating with slower clock speeds when hyperlinks are used than the clock speeds that may be available when hyperlinks are not used. In some implementations, the clock speed of the integrated circuit 100 is itself controlled by one or more mode indicators.

4.2 Direct Memory Access

The static and dynamic networks transport data among buffers in the switches. The buffers are used as first-in-first-out (FIFO) queues that are able to pour data into various sinks on the tile, or receive data from various sources on the tile. The processor 200 on a tile can be a source or sink of data to or from a buffer in the switch in the same tile or in a neighboring tile. For example, a buffer can be coupled to a register that the processor 200 can write to or read from. In some cases, a processor 200 may read a data word from the switch buffer and execute an instruction to store that data word in memory (e.g., either in a local cache in the tile, or in a memory external to the tiles 102 via the dynamic network).

In other cases, a larger amount of memory (e.g., multiple words) may need to be stored in memory. In some examples, each tile includes a DMA engine. Using a direct memory access (DMA) approach, a block of data including multiple words can be stored in memory without requiring the processor to execute an instruction to store each word of the data (or each segment of data greater than a cache line). The processor executes one or more instructions to set up the DMA transfer for outgoing DMA. For example, the processor writes a start address and an end address of the data block to be transferred into one or more registers. Alternatively, the processor writes a start address and the size of the data block into registers.

A DMA controller in the tile transfers the data in the background without processor intervention, enabling the processor to execute other instructions during the DMA transfer. At other times, such as during a cache miss, the size of data that is sent into the cache of a tile without processor intervention is limited to one cache line (e.g., around 16 to 128 bytes). The size of the data block transferred in a DMA transfer can be much larger than a cache line (e.g., 4 Kbytes). This DMA approach can be indicated by control information within the data (e.g., the data can contain a DMA tag that determines whether the data is destined for a register (to be handled by the processor 200), or for direct memory transfer. In the static network, the tag can be appended to the data. In the case of the dynamic network, since the data is in the form of a packet with a header, the tag can be included in the header.

If the DMA tag is set, the data arriving at the switch of a destination tile is deposited into a DMA queue and the data is passed directly into a cache or static memory without involving the processor 200. If the DMA tag is not set, the data is put into a FIFO coupled to the registers of the processor 200. The value of this twofold processing is that when the data is to go into memory, the processor does not have to be involved in the receipt of the data. The DMA tag is set by the sender of the data.

In an alternative implementation, the DMA tag is not contained in the data (or its header), rather there is a mode indicator called the DMA mode indicator in the appropriate network port (or in the tile). If this DMA mode indicator is set, then the data is directed to memory.

4.3 Multiple Processor Instruction Streams

There are a variety of ways in which a tile 102 is able to process multiple instruction streams. A tile 102 is able to process an instruction stream for the processor 200 and an instruction stream for the switch 220. In the operand decoupling mode described above, the switch 220 processes multiple instruction streams (e.g., derived from a macro instruction stream) using multiple program counters to switch data for multiple output ports independently. These separate processor and switch instruction streams provides a form of concurrency in which a tile can execute computations and switch data in the same clock cycle.

In another form of concurrency, some or all of the tiles can include a processor 200 that is configured to process multiple instruction streams. The multiple instruction streams can be derived from a common macro instruction stream such as in a VLIW processor, or can be provided as separate threads. The processor 200 can include multiple logic units that process a corresponding one of the instruction streams, based on a common program counter as in a VLIW processor, or based on separate program counters as in a multithreaded processor. The processor 200 can also include multiple register files each associated with a corresponding one of the instruction streams. These multiple processor instruction streams provide a form of concurrency in which a tile can execute multiple computations in same clock cycle.

The multiple logic units can include, for example, one or more of an arithmetic logic unit, an arithmetic unit, a multiply accumulate unit, a multiply add unit, a vector unit, a load or store unit, or a branch unit. The logic units can also include units that interact with the switch, such as a switch read unit, which reads data received by the switch, or a switch write unit, which stores data that is to be sent over the switch. For example, a switch write unit can include a FIFO buffer or a register.

Figure 19A:
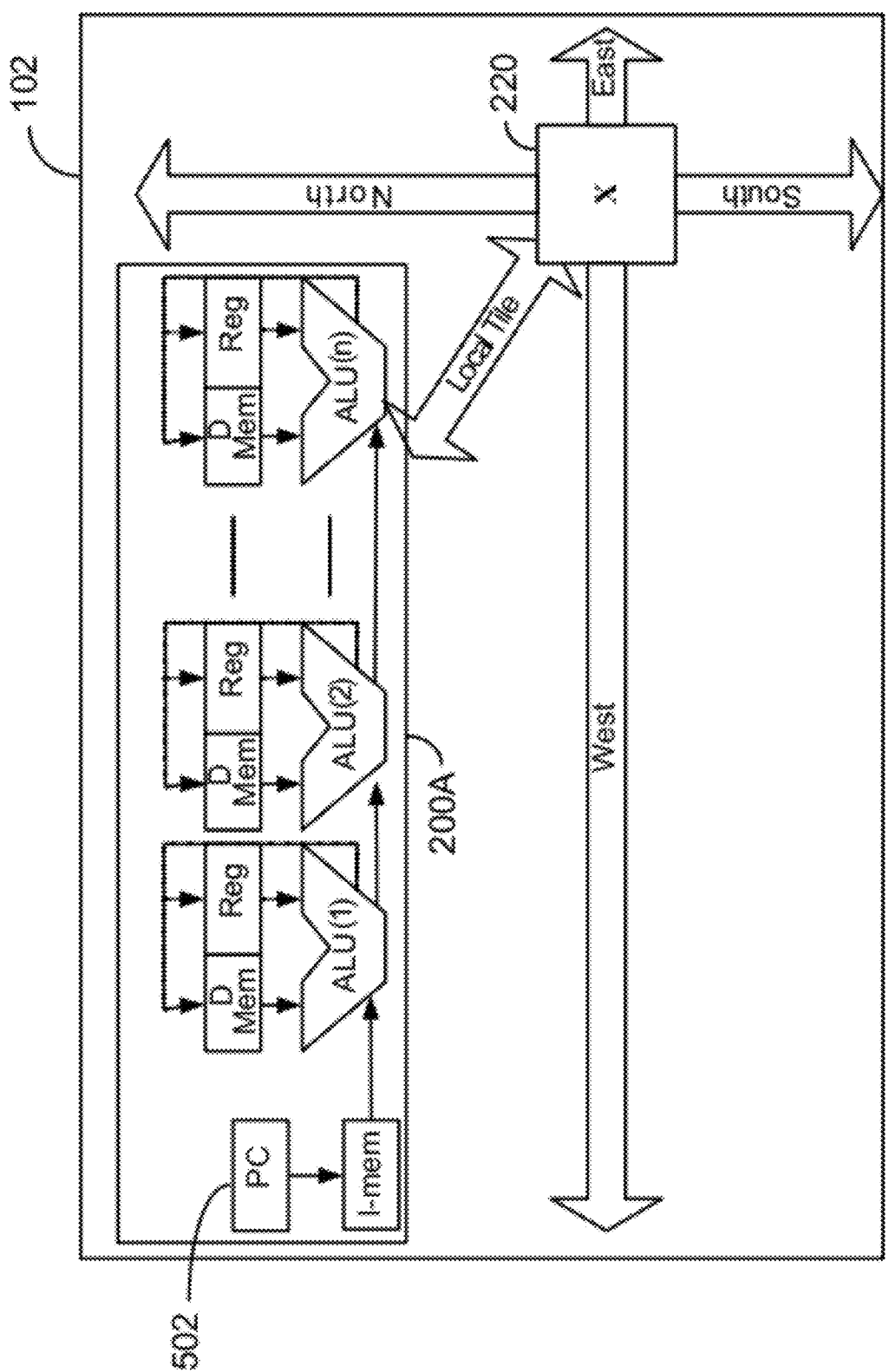
FIG. 19A is a block diagram of a VLIW processor.

In the case of a VLIW processor, the processor 200 is configured to execute instructions taking into account interactions with the switch 220. For example, the subinstructions of a VLIW instruction are executed together; therefore, if some subinstructions are reading from or writing to a port of the switch, the processor may need to stall execution of the VLIW instruction if a subinstruction is temporarily unable to read from or write to a port of the switch. FIG. 19A shows an example of a tile 102 including a VLIW processor 200A having n ALUs (ALU(1)-ALU(n)) that operate based on a common program counter 502.

Figure 19B:
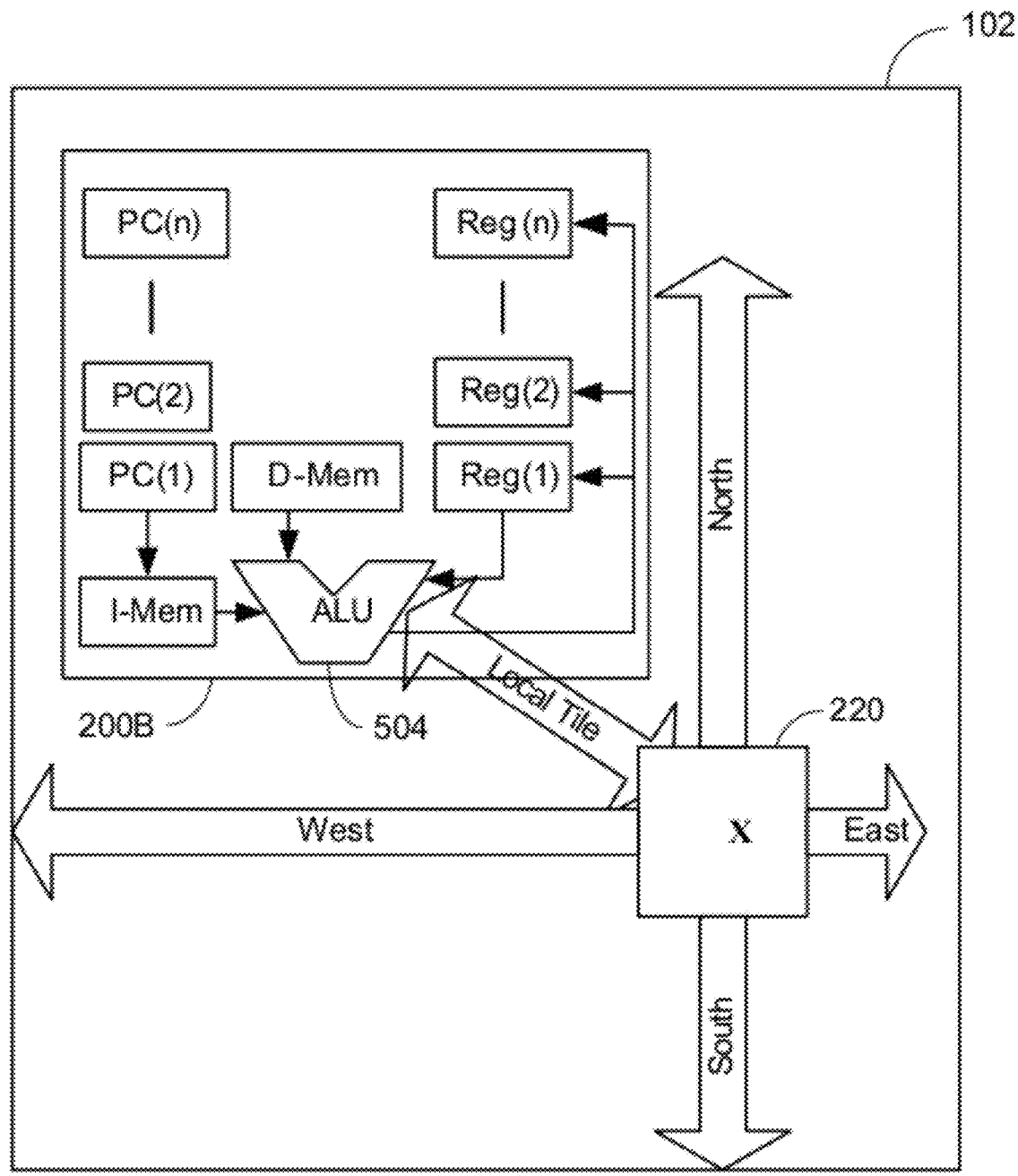
FIG. 19B is a block diagram of a multithreaded processor.

There can be a long latency associated with certain tasks such as accessing memory, sending data across the network, an synchronizing multiple tiles. When one thread of a multithreaded processor is executing an instruction involving one of these tasks, another thread can perform another task so that the latency associated with those tasks are overlapped. FIG. 19B shows an example of a tile 102 including a multithreaded processor 200B having n program counters (PC(1)-PC(n)) and n register files (Reg(1)-Reg(n)) that can be selectively coupled to an ALU 504 so that when one thread is waiting on a long latency event, the processor 200B switch to a new thread in a new context, characterized by a different program counter and register file.

Figure 19C:
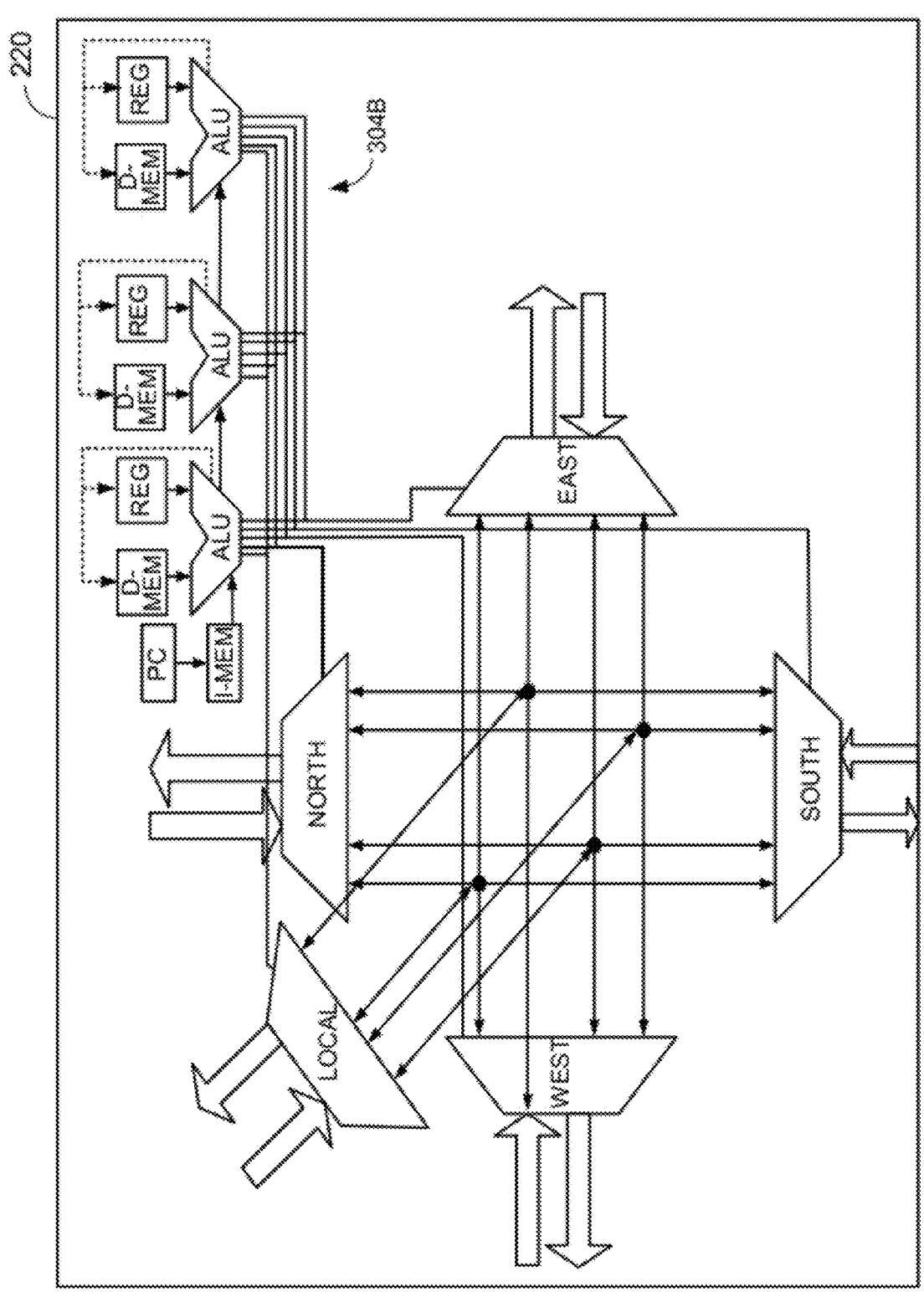
FIG. 19C is a block diagram of a VLIW switch processor.
Figure 19D:
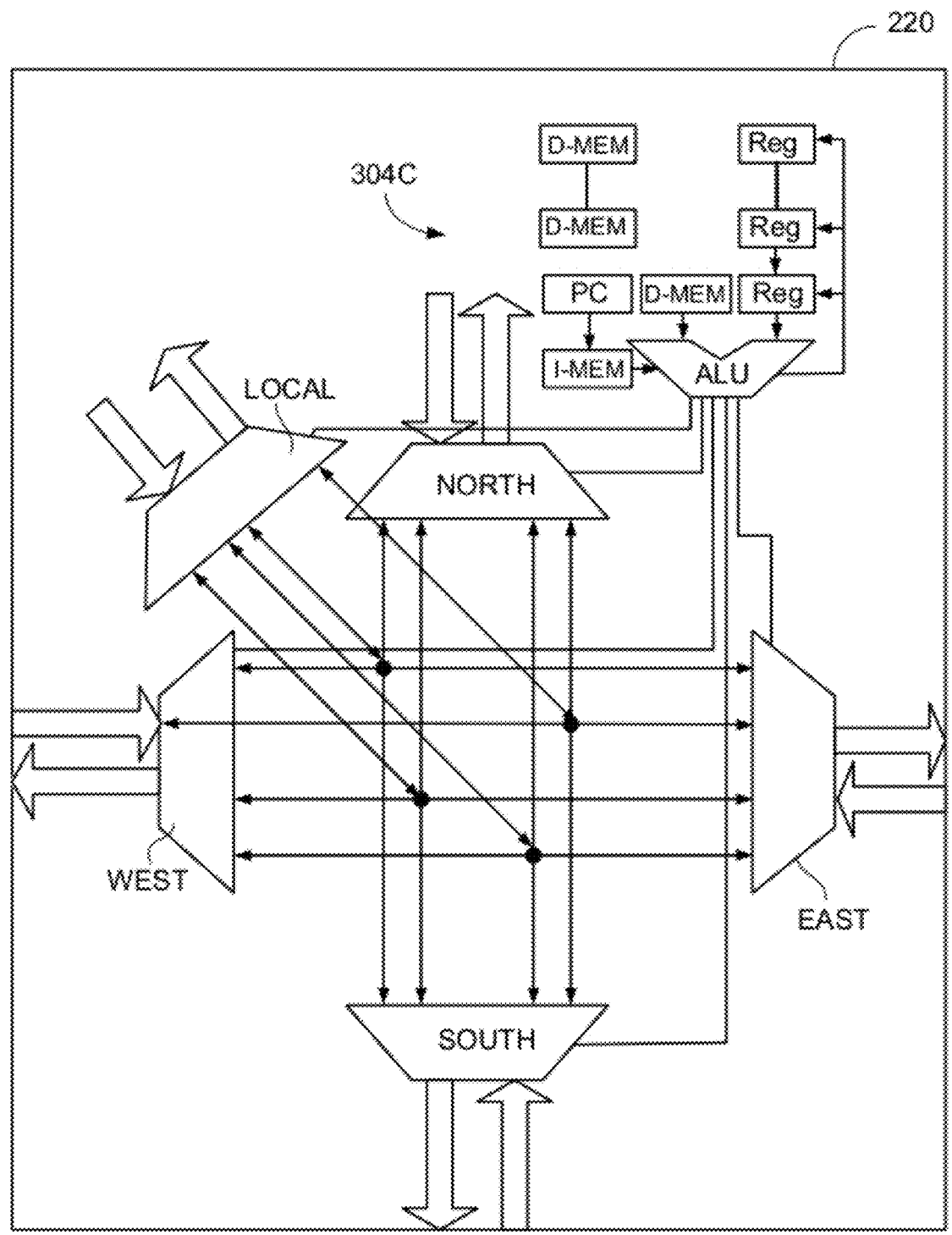
FIG. 19D is a block diagram of a multithreaded switch processor.

A switch processor can also be a VLIW processor 304B or a multithreaded processor 304C, as shown in FIGS. 19C and 19D, respectively.

When a compiler partitions a program into subprograms to execute in a tiled integrated circuit having VLIW or multithreaded processors in the tiles, the compiler generate parallel code for a maximum number of threads larger than the number of tiles in the integrated circuit 100 (e.g., up to four times the number of tiles if each tile has a VLIW processor with four subinstructions).

In the partitioning phase, the compiler partitions a program into sets of instructions that are able to be executed in parallel. For example, the compiler uses a graph to indicate which instructions can be executed in parallel. In the placement phase, the compiler maps the sets of instructions to tiles. The compiler determines in which tile each of the sets of instructions is to be executed is based in part on critical path information from the graph to determine which instructions to run in the same tile, and which to run in separate tiles. One or more of these sets of instructions selected to run within the same tile represent a subprogram for the tile.

Thus, a subprogram for a tile may include multiple sets of instructions that can be executed in parallel threads within the tile. For example, in a VLIW processor, for those sets of instructions selected to execute on the same tile, the compiler determines instructions within the sets of instructions that will run in parallel in the same VLIW macroinstruction. The compiler determines instructions for a macroinstruction based in part on information characterizing which functional units (e.g., ALUs) are available to be used in parallel to execute a macroinstruction.

5 Dynamic Networks

As described above, the switches 220 include dynamic network circuitry for routing packets of data based on a destination address in the header of the packet. The payload of a packet includes a message or a portion of a message that is delivered to the tile at the destination address. Packets can have a fixed length, or a variable length. In one approach to variable length packets, a packet can vary in length from one word plus a header word, up to 127 words plus a header word. The header word contains a field that determines the length of the packet.

The switch control module within a tile controlling the dynamic switch (e.g., a dynamic switch processor) performs functions for transmitting, routing, and receiving packets. In some cases, the control module in a receiving tile processes multiple packets to recover a message that is larger than the maximum packet size. For example, the control module in the transmitting tile segments the message among payloads of multiple packets. The control modules in the tiles along a route between the sending and receiving tiles route the segments in the order in which they are received. The control module in the receiving tile reassembles the message. This segmentation and reassembly can be controlled by a communication protocol in software running in a dynamic switch processor of a transmitting or receiving endpoint tile, or in software running in the tile's main processor 200. In other cases, the atomicity afforded to data by packetization enables data associated with an atomic transaction to be transmitted in the payload of a single packet to ensure that the data will not be interrupted by other packets.

The tiles can include circuitry for multiple independent dynamic networks. The different dynamic networks can each be dedicated to handling a particular type of traffic. For example, one dynamic network handles traffic associated with a user, called the User Dynamic Network (UDN). Another dynamic network handles traffic associated with the operating system and is primarily used to communicate with input and output devices, called the Input/Output Dynamic Network (IODN). Another dynamic network handles enables tiles and I/O devices to interface with copious memory (e.g., DRAM coupled to the network), called the Memory Dynamic Network (MDN).

In one approach to deadlock recovery, described in more detail below, the MDN is used in a specific manner to guarantee that deadlock does not occur on the MDN. The MDN is also used for inter-tile memory traffic (e.g., to a tile's data cache). Data can be coupled to the MDN by the processor 200 in the tiles, or by a DMA interface in the tiles. The DMA interface can be coupled to one or more of the other networks as well.

The control module handles routing data from a sender to a receiver. Routing includes processing a destination identifier to determine a route the data should traverse to the receiver. In some implementations, the dynamic networks have a two-dimensional topology and use dimension-ordered worm-hole routing. The dimension-ordered nature of the networks means that packets on the network follow a deterministic routing path, for example, first along the "x" dimension (e.g., East/West) and then along the "y" dimension (e.g., North/South) in a two-dimensional network.

Figure 20:
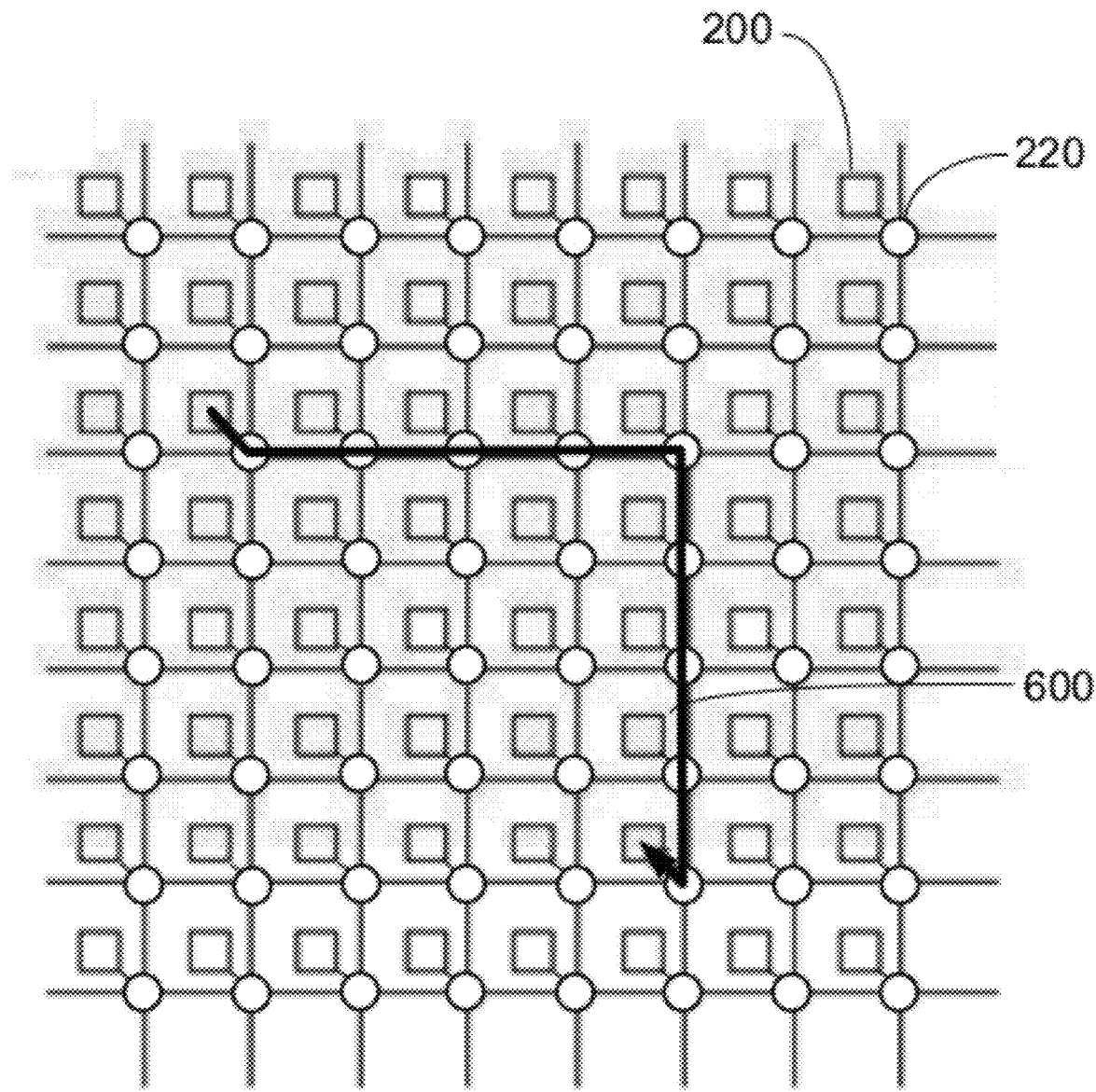
FIG. 20 is a block diagram of a route through an array of tiles.

FIG. 20 shows the path 600 taken by a packet sent from the tile at coordinates (1,2) to the tile at coordinates (5,6). As in the static network, each clock cycle one word of data traverses a link from one tile to a neighboring tile. The head word of the packet (e.g., the header) worms through the network and reserves links between the intermediary switches along the route. Subsequent words of the packet up to the tail word continue to worm through the network along the same path set up by the head word. The tail of a packet worms through the network and clears the path for use by other packets. As the tail traverses the network, it clears up a path for other packets to use reserved links. Wormhole networks are named as such because packets appear to worm through the network. One reason that wormhole networks are advantageous is that they reduce the amount of buffer space needed in the switches.

A packet reaches its destination tile when both the x and y coordinates match the coordinates of the destination tile (e.g., stored in a register loaded when the system boots). Alternatively, the packet header can contain the number of hops in the x dimension as a $\Delta x$ count and the number of hops in the y dimension as a $\Delta y$ count. In this scheme, the value of $\Delta x$ is decremented after each hop in the x dimension, and the value of $\Delta y$ is decremented after each hop in the y dimension, and the packet reaches its destination when $\Delta x$ and $\Delta y$ become 0.

After a packet reaches the destination tile, the packet is then sent to a final destination (which can also be indicated in the packet header). The final destination can direct data to an off-tile location over a network port to the north, east, south, west, or can direct the data to a functional unit within the tile, such as the processor or an on-tile memory unit or functional unit. This final destination routing enables data to be directed off of the network to an I/O device or memory interface, for example.

The final destination can be encoded in multiple bits, for example, indicating a direction in 2-dimensions (north, east, south, west) corresponding to a port that leads out of the tile array, or higher than 2-dimensions (e.g., up or down). The final destination can also be encoded in a single bit, for example, indicating a either default final destination on the tile (e.g., the processor), or a default destination off of the tile (a predetermined "external port" that leads off the edge of the tile array).

The final destination can also be indicated by a combination of information in the packet and information stored in the tile (or otherwise accessible to the tile's switch). For example, in the case in which the final destination information in the packet is a single bit, the final destination information stored in the tile can indicate one of multiple on-tile locations (the processor or a DMA engine), or one of multiple off-tile locations (one of the two external ports of a corner tile).

5.1 Local Link-Level Flow Control

Reliable data delivery is achieved in the dynamic network using flow control to ensure that data is not lost or dropped when being routed in the network. Local or "link-level" flow control ensures that data is lost or dropped over a link between two tiles (e.g., due to limited buffering at a switch). Global or "end-to-end" flow control is used to further control the rate of data delivery between a sending tile (the "sender") and a receiving tile (the "receiver"), and is described in more detail below. Link-level flow control is not in general sufficient to provide end-to-end flow control due to the possibility of deadlock, (in this case, for example, due to limited buffering at a receiving tile at the end of a route) also described in more detail below.

One aspect of flow control includes managing the dynamic switch input buffers. Backward pressure is used to prevent a sending switch from sending further data if the input buffer at the receiving switch is full. This type of flow control is also called "backward flow control."

A first approach to implementing link-level flow control includes a signal sent from the receiver to the sender (e.g., over a dedicated wire) indicating that a particular input buffer is full, and that the sender should not send more data over the link. This "full signal" should be generated and sent to the sender quickly to reduce the delay in the critical path of link-level flow control.

A second approach to implementing link-level flow control is a credit-based approach. In this approach, the sender does not need to receive a signal from the receiver that buffer space is available (the buffer is not full) each time data is sent. In the credit-based approach, each sender maintains a count of the remaining space in the receiver's input buffer. As data is sent over a link, the sender decrements the count. When the count reaches zero, there is no more space in the input buffer and the sender is barred from sending data over the link. As data is read out of the input buffer, the receiver sends credits to the sender. The sender increments the count for each credit received.

In the credit-based approach, dynamic switch circuitry can be pipelined and can maintain full speed switch throughput. The size of the input buffer and associated credit counter are selected appropriately to account for the latency needed to send a credit from the receiver to the sender and to determine whether to send any further credits.

Figure 21:
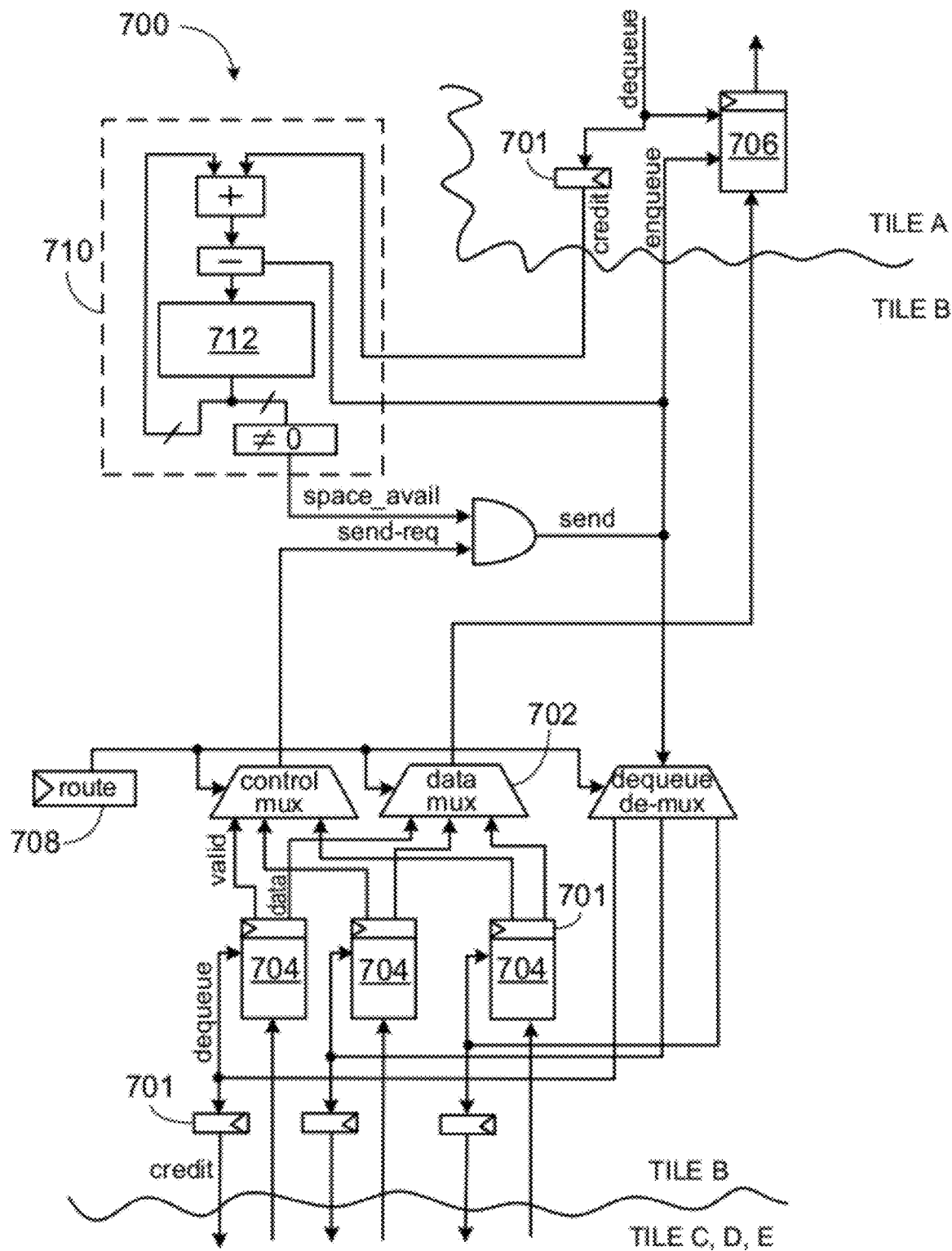
FIG. 21 is a block diagram of switching circuitry.

Referring to FIG. 21, switching circuitry 700 for a credit-based approach switches data among input buffers that each store up to 3 words of data corresponding to the arrangement of pipeline registers 701. The switching circuitry 700 is a portion of the dynamic switch that controls the flow of data from a sender tile_b to a receiver tile_a. The sender tile_b includes a data multiplexer 702 that selects a data word from input buffers 704 to send to the input buffer 706 of the receiver tile_a, according to route information stored in a route register 708. The route information is generated based on the headers of incoming packets. The sender tile_b includes an input buffer for each of the tiles to which it is connected (tile_a, tile_c, tile_d, tile_e, . . . ). However, since the switching circuitry 700 controls the flow of data to tile_b, the data multiplexer 702 does not necessarily need to be able to pull data from tile_b. Corresponding circuitry is used to control the flow of data from the sender tile_b to other tiles to which tile_b is connected.

Control circuitry 710 counts credits in a credit counter 712 corresponding to input buffer space available in the receiver tile_a. If there is at least one credit and an input buffer has data to be sent, the control circuitry 710 will assert a signal to dequeue data from the appropriate one of the input buffers 704 and enqueue the data to the input buffer 706. Otherwise the control circuitry 710 will stall, not sending any data to the receiver tile_a.

The credit counter 712 tracks available storage space in the input buffer 706 to ensure that the input buffer 706 will not overflow. However, the number of credits stored in the credit counter does not necessarily correspond to the actual amount of available buffer space in the input buffer 706 at that time since the control circuitry accounts for data that may flow into the input buffer 706 from pipeline registers.

The switching circuitry 700 also includes a mechanism to facilitate context switching in a tile. When one tile is entering a state in which no data should be received (e.g., performing a context switch, or entering a low-power mode), that tile is able to signal each neighboring tile to stop sending data using a "stop signal" transmitted over a wire between the tiles. For example, tile_a can assert a stop signal line 720 to override any remaining credits that would otherwise enable tile_b to keep sending data.

5.2 Register Mapped Network Communication

As described above, in some examples the dynamic networks are able to transfer data to and from the main processor through a register mapped interface. When the main processor reads a register corresponding to a particular network, the data is dequeued from the respective network input buffer. Likewise, when a register associated with a particular network is written by the processor, the data is directly sent out of a corresponding network output port.

The register mapped networks are both read and write flow controlled. For instance, if the processor attempts to read from a register connected to a network and the data has not arrived yet, the processor will stall in anticipation of the data arriving. Outbound data communication can also receive backward pressure from the networks to prevent it from injecting into the network if the network buffer space is full. In this case, the processor stalls when the outbound buffer space is full for a particular network.

For efficient register mapped communication, the dynamic networks are integrated closely into the processor's pipeline. In effect, they contribute to the scoreboarding in the processor, and the processor maintains correct output ordering across variable length pipelines. One possible implementation of this register mapped communication is via integration of the input or output buffers into the bypass network of the processor pipeline. By doing so, for example, a value going out from the ALU in a pipeline can go to the switch on an immediately following cycle, and well before the pipeline writeback stage (which is the "pipeline commit stage" in some pipelines) when the data value is written into the register file. In the case of the tiled integrated circuit in which pipelines are coupled via a switch network, the pipeline commit stage is the earlier stage (generally earlier than the writeback stage) in which a value can be injected into the network. This is called an early commit pipeline. Also, in order to reduce latency, it is desirable to expeditiously forward a value to the network as soon as the value is computed. In order to accomplish this, an implementation may contain a forwarding network which chooses the oldest completed information in the pipeline to forward out to the network.

6 Tile Architecture

Figure 22:
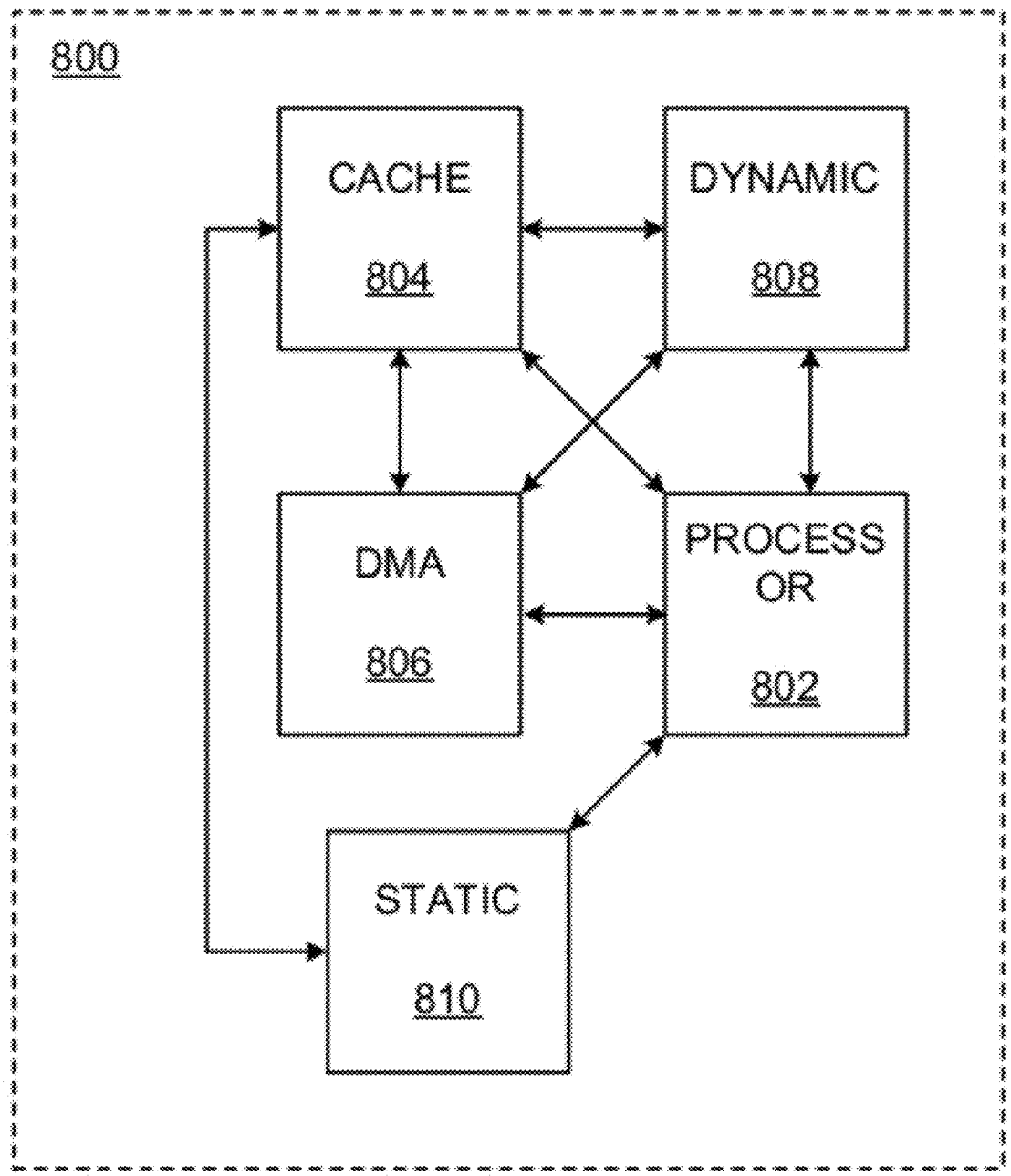
FIG. 22 is a block diagram of integrated circuit modules.

FIG. 22 is block diagram showing the relationships among the functional modules in an example of a tile architecture for an implementation of the integrated circuit 100. The tile 800 includes a main processor 802 that provides the main computational resource inside the tile. The tile 800 includes a cache module 804 that includes memory that can be configured as a cache managed by a cache state machine inside the module 804. The tile 800 includes a DMA engine 806 to manage access to external memory, enabling the main processor 802 to perform other tasks.

The main processor 802 communicates over the dynamic network through a dynamic network switch module 808, and over the static network through a static network switch module 810. The main processor 802 sends data to and receives data from the switch modules to communicate with other tiles and I/O devices via the inter-tile data paths. The switch modules include switching circuitry to forward data received over data paths from other tiles to destinations within a tile and to switches of other tiles, and to forward data received from sources within a tile to switches of other tiles.

The dynamic network switch module 808 manages access to multiple independent dynamic networks, including, for example, the memory dynamic network (MDN) and the I/O dynamic network (IODN). The module 808 includes a "switch point" for each of the dynamic networks accessed by a tile.

Various features of the tiled integrated circuit architecture and programming described herein can be implemented by modifying versions of the tiled integrated circuits described in U.S. patent application Ser. Nos. 11/302,956 or 11/314,861, or in the following publications: "Baring It All to Software: RAW Machines" *IEEE Computer*, September 1997, pp. 86-93, "Space-Time Scheduling of Instruction-Level Parallelism on a Raw Machine," *Proceedings of the Eighth International Conference on Architectural Support for Programming Languages and Operating Systems (ASPLOS-VIII)*, San Jose, Calif., Oct. 4-7, 1998, "Raw Computation" *Scientific American*, August 1999, Vol. 281, No. 2, pp. 44-47, "The Raw Microprocessor: A Computational Fabric for Software Circuits and General Purpose Programs," *IEEE Micro*, March/April 2002, pp. 25-35, and "A 16-issue multiple-program-counter microprocessor with point-to-point scalar operand network," *Proceedings of the IEEE International Solid-State Circuits Conference*, February 2003, each of which is incorporated herein by reference.

Various techniques described herein can be implemented in additional types of integrated circuit architectures. For example, some techniques can be used in an integrated circuit in which multiple processor cores include respective computation units interconnected by a shared interconnection network such as a bus, or a pipelined bus, in addition to a tiled integrated circuit architecture in which multiple processor cores are interconnected by a network of switches connected to respective computation units.

It is to be understood that the foregoing description is intended to illustrate and not to limit the scope of the invention, which is defined by the scope of the appended claims. Other embodiments are within the scope of the following claims.

What is claimed is:

1. A method for processing packets in a system that comprises a plurality of interconnected processor cores, the method comprising:
   receiving packets into a plurality of queues;
   associating at least some nodes at a first level in a hierarchy of nodes with respective ones of the plurality of queues, and associating at least some of the nodes at a second level in the hierarchy with respective rates of transfer;
   mapping a first set of nodes at the first level in the hierarchy to a plurality of processor cores based on at least one rate associated with a node at the second level in the hierarchy, with a first subset of nodes in the first set being mapped to a first group of processor cores and a second subset of nodes in the first set being mapped to a second group of processor cores, and with a first processor core in the first group being responsible for a first function for the nodes in the first subset, a second processor core in the first group being responsible for a second, different function for the nodes in the first subset, a first processor core in the second group being responsible for the first function for the nodes in the second subset, and a second processor core in the second group being responsible for the second, different function for the nodes in the second subset; and
   processing the packets in processor cores including the mapped processor cores according to the hierarchy.

2. The method of claim 1, wherein each node in the first set is associated with a rate-limit, and mapping the first set of nodes to the plurality of processor cores comprises selecting a plurality of nodes according to a sum of the rate-limits of the plurality of nodes that provides a maximum rate at which at least portions of packets can be transmitted from at least one processor core in each of the groups.

3. The method of claim 2, wherein the rate associated with a node at the second level in the hierarchy comprises a rate associated with a node mapped to a higher-level processor core that receives packets from at least one processor core in each of the groups.

4. The method of claim 3, wherein the sum of the rate-limits is no greater than the rate associated with the node mapped to the higher-level processor core.

5. The method of claim 2, further comprising mapping a second set of nodes at the first level in the hierarchy, each associated with at least one of the plurality of queues, to one or more groups of processor cores different from the first and second groups of processor cores.

6. The method of claim 5, wherein processing the packets comprises passing at least a portion of at least some of the packets received in the plurality of queues associated with the nodes of the second set from a processor core in the one or more groups to the first processor core in the first group according to a rate shaper that smoothes traffic flow to remove burstiness of packets arriving in the plurality of queues associated with the nodes of the second set.

7. The method of claim 1, wherein the mapping occurs before the packets have been received into the plurality of queues.

8. The method of claim 1, wherein at least some of the mapping occurs after at least some of the packets have been processed in processor cores that have already been mapped.

9. The method of claim 1, wherein processing the packets comprises passing at least a portion of at least some of the packets received in the plurality of queues from a processor core mapped to a node associated with at least one of the plurality of queues through processor cores mapped to a series of nodes at different levels of the hierarchy.

10. The method of claim 9, wherein a portion of a packet is passed from a processor core mapped to a first node at the first level to a processor core mapped to a second node at the second level only when one or more credit-related conditions are met.

11. The method of claim 10, wherein a first credit-related condition comprises the first node receiving flow credits from the second node according to an ability of the second node to receive additional packet portions from the first node.

12. The method of claim 11, wherein a second credit-related condition comprises the first node receiving rate credits based on a rate limit that indicates a maximum transfer rate for the first node.

13. The method of claim 9, wherein passing at least a portion of a packet comprises passing a packet descriptor that includes a number of bytes of data in the corresponding packet and a pointer to the packet.

14. The method of claim 9, wherein passing at least a portion of a packet from a processor core mapped to a first node to a processor core mapped to a second node comprises passing a portion of the packet over a network connection between the processor cores.

15. The method of claim 14, wherein passing a portion of the packet over a network connection between the processor cores comprises passing the portion of the packet over a path that includes one or more processor cores between the processor core mapped to the first node and the processor core mapped to the second node.

16. The method of claim 1, wherein the first function comprises a scheduling function in which packets are processed according to a credit-based permission system.

17. The method of claim 16, wherein the second function comprises a rate-limiting function in which an average rate at which packets are processed is limited.

18. The method of claim 1, wherein the number of groups of processor cores to which respective subsets of nodes are mapped is based on a number of packets per second that each group of processor cores is able to process.

19. The method of claim 1, wherein the processor cores in each group of processor cores are adjacent within an interconnection network of the plurality of interconnected processor cores.

20. A system, comprising:
   a plurality of processor cores interconnected by an interconnection network; and
   information for configuring the system to execute instructions to
   receive packets into a plurality of queues;
   associate at least some nodes at a first level in a hierarchy of nodes with respective ones of the plurality of queues, and associating at least some of the nodes at a second level in the hierarchy with respective rates of transfer;

map a first set of nodes at the first level in the hierarchy to a plurality of processor cores based on at least one rate associated with a node at the second level in the hierarchy, with a first subset of nodes in the first set being mapped to a first group of processor cores and a second subset of nodes in the first set being mapped to a second group of processor cores, and with a first processor core in the first group being responsible for a first function for the nodes in the first subset, a second processor core in the first group being responsible for a second, different function for the nodes in the first subset, a first processor core in the second group being responsible for the first function for the nodes in the second subset, and a second processor core in the second group being responsible for the second, different function for the nodes in the second subset; and process the packets in processor cores including the mapped processor cores according to the hierarchy.

21. The system of claim 20, further comprising a memory for storing the information for configuring the system.

22. The system of claim 20, wherein the first function comprises a scheduling function in which packets are processed according to a credit-based permission system.

23. The system of claim 22, wherein the second function comprises a rate-limiting function in which an average rate at which packets are processed is limited.

24. The system of claim 20, wherein the interconnection network comprises a two-dimensional network.

25. The system of claim 20, wherein the interconnection network comprises a bus network, a ring network, a mesh network, or a crossbar switch network.

26. The system of claim 20, wherein each of the plurality of processor cores corresponds to a tile on an integrated circuit, each tile comprising:
   a computation unit; and
   a switch including switching circuitry to forward data received over data paths of the interconnection network from other tiles to the computation unit and to switches of other tiles, and to forward data received from the computation unit to switches of other tiles.

27. The system of claim 26, wherein the computation unit comprises a pipelined processor and the switch is coupled to a plurality of pipeline stages of the pipelined processor.

28. The system of claim 27, wherein at least one port of the switch is mapped to a register name space of the pipelined processor.

* * * * *